Figure 5:
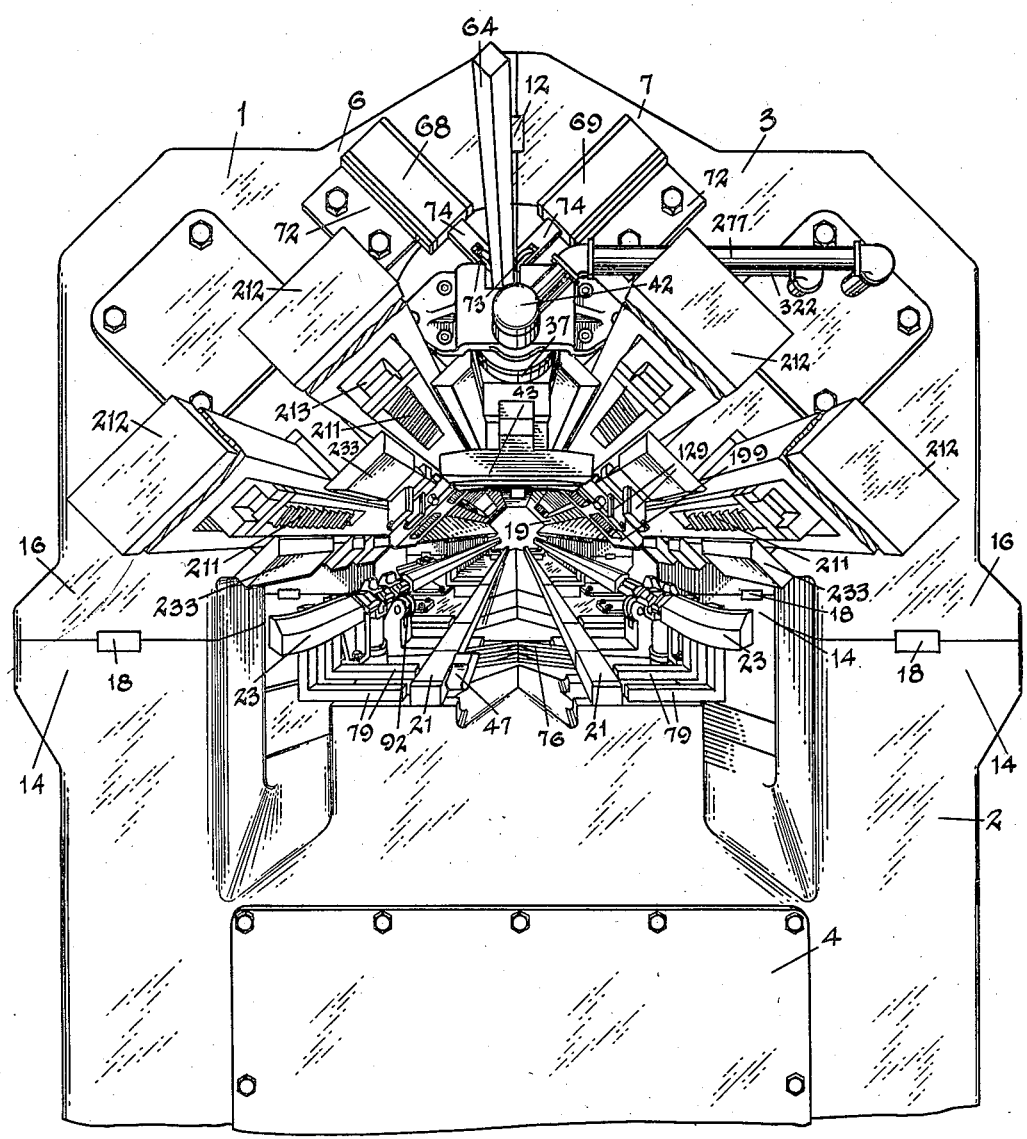

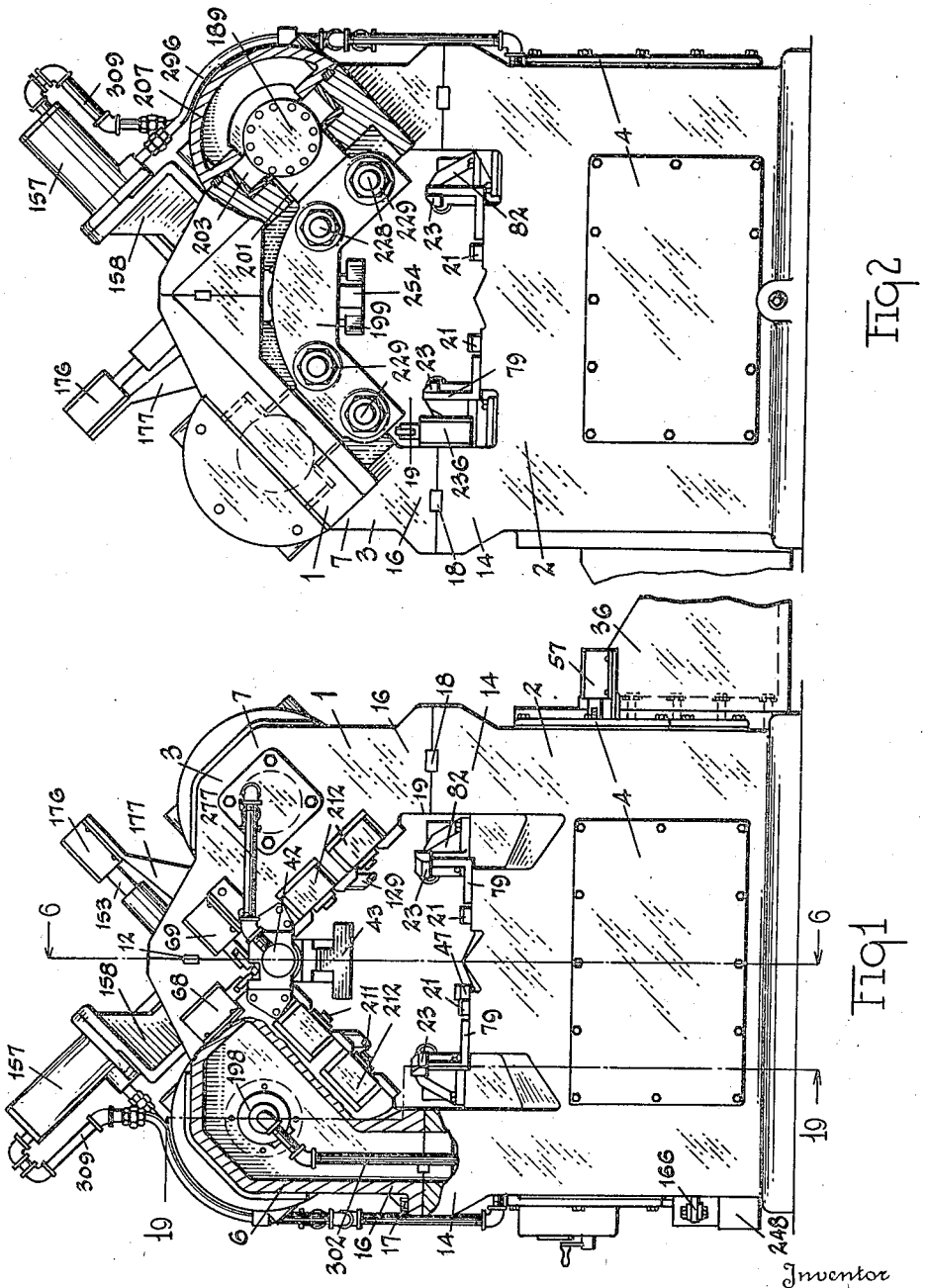

Sept. 13, 1938.　　　F. J. LAPOINTE　　　2,129,850
SURFACE BROACHING MACHINE
Filed Feb. 17, 1936　　　16 Sheets-Sheet 2
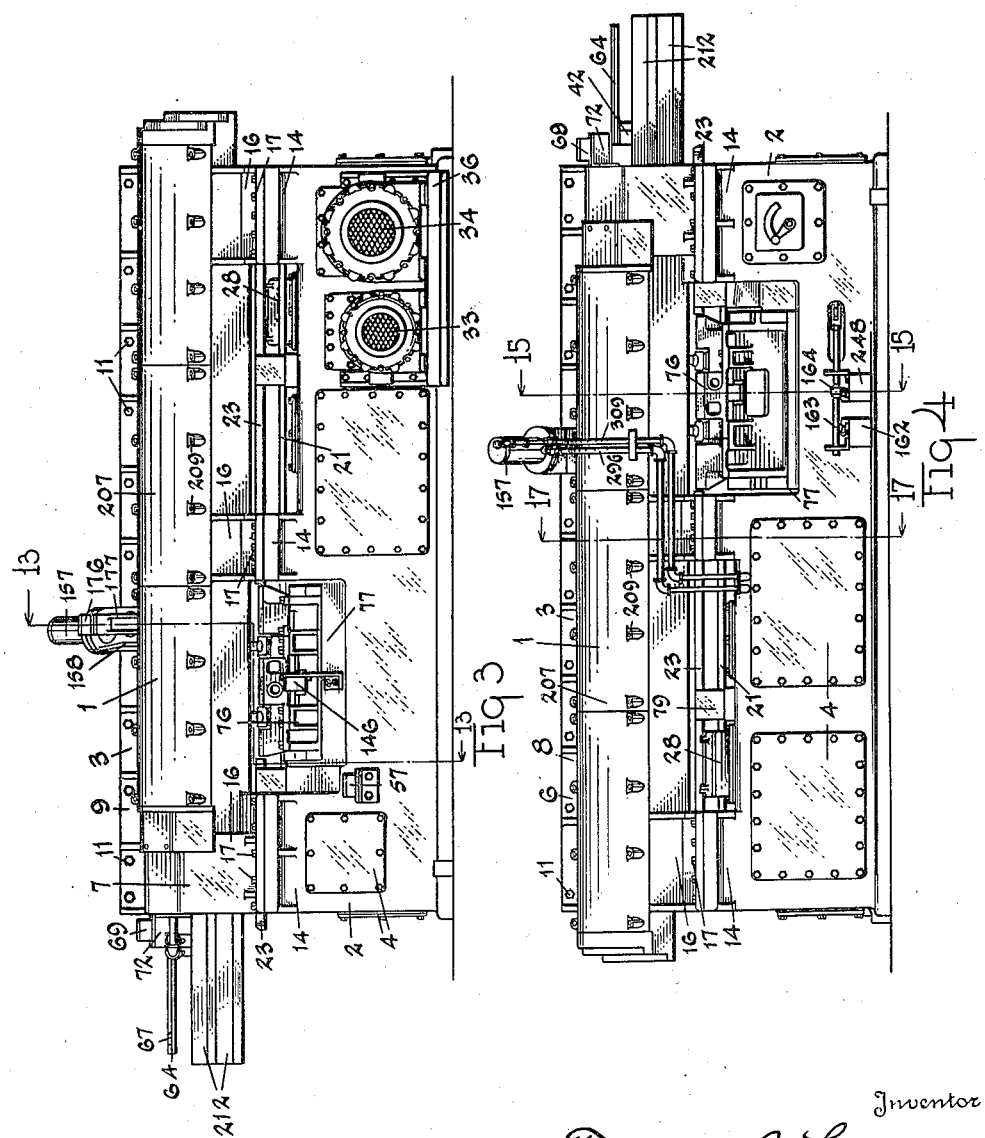
Inventor
Francis J. Lapointe
By [signature]
Attorney

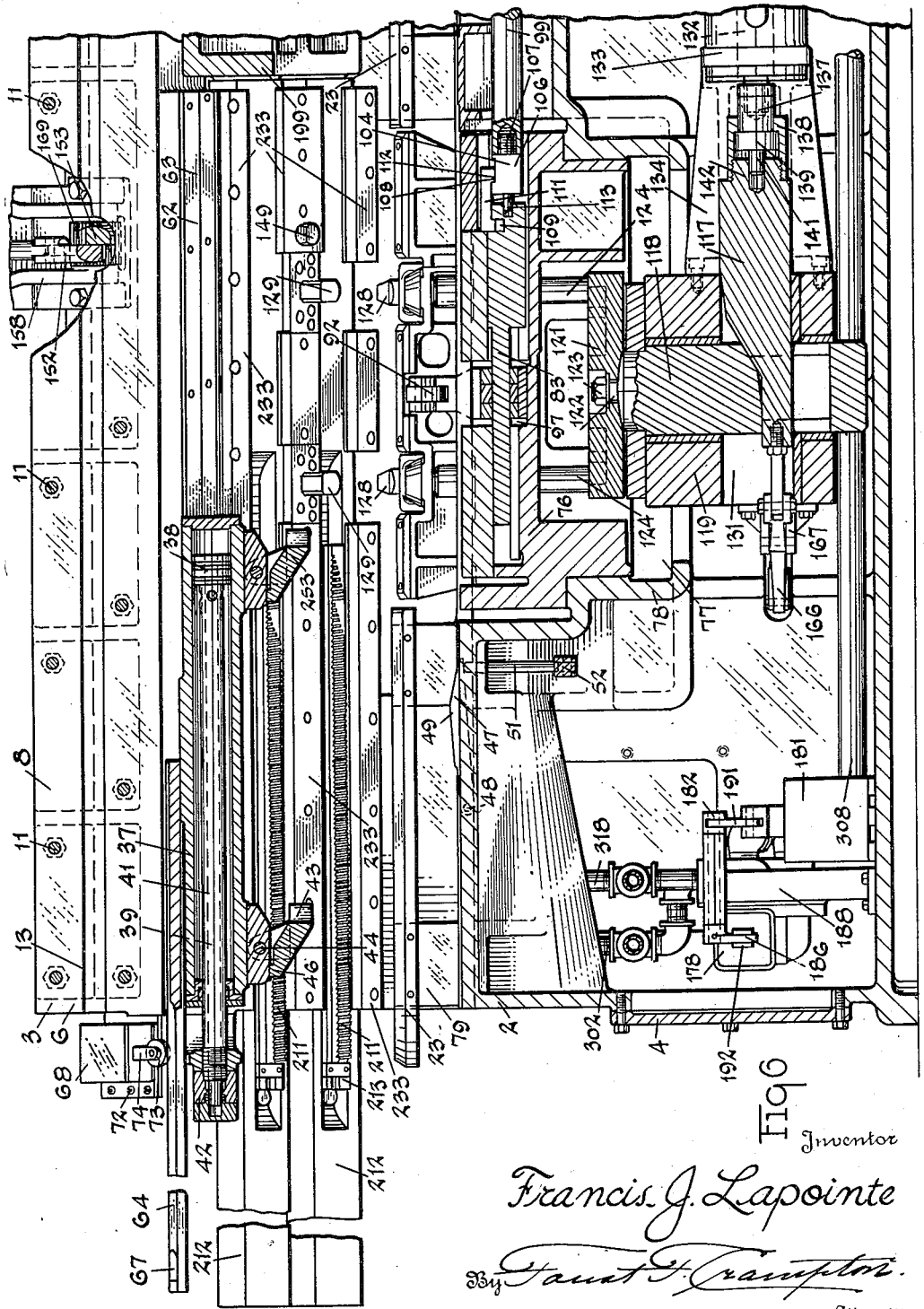

Sept. 13, 1938.  F. J. LAPOINTE  2,129,850
SURFACE BROACHING MACHINE
Filed Feb. 17, 1936   16 Sheets-Sheet 5
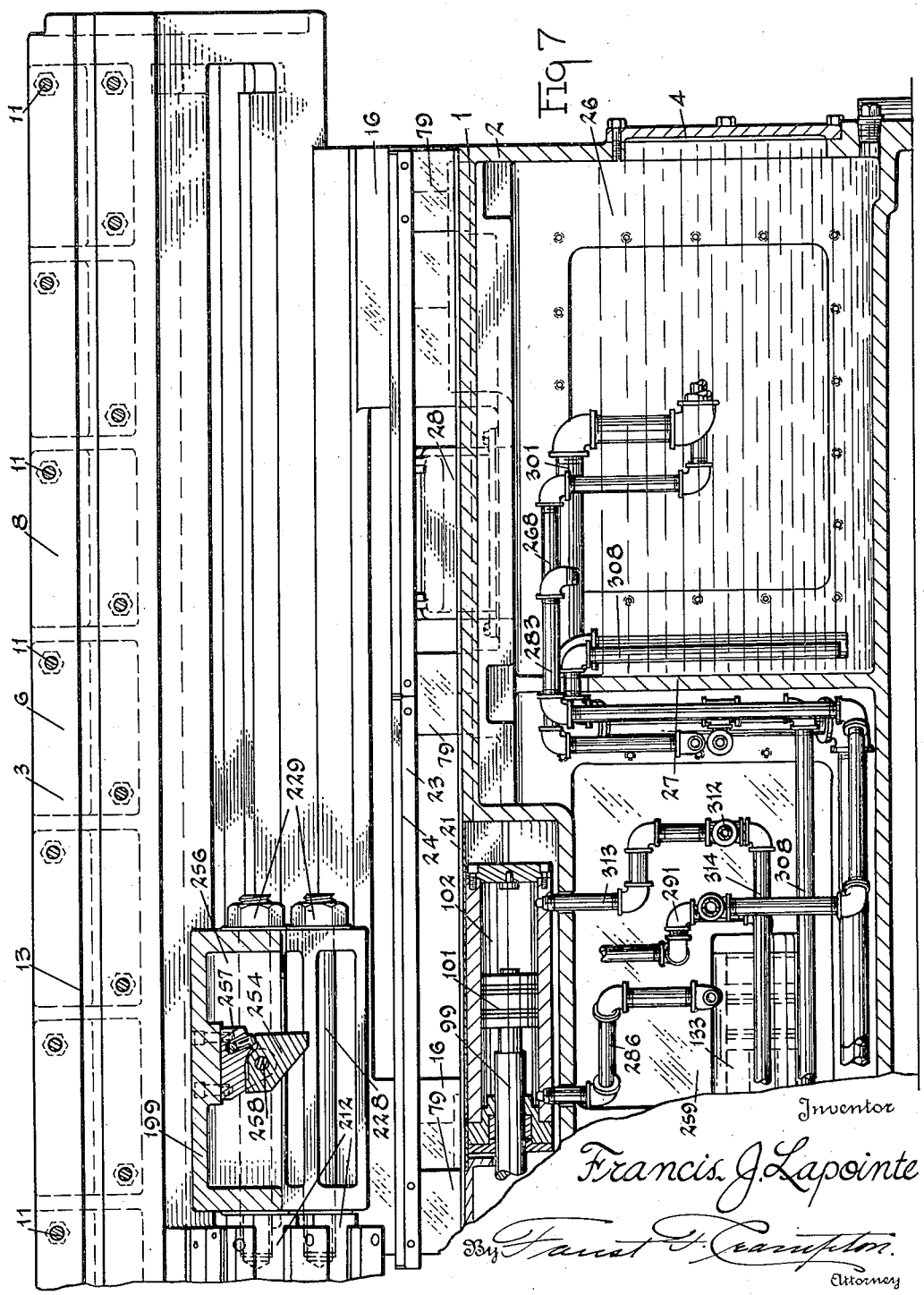
Inventor
Francis J. Lapointe
By Faust G. Crampton.
Attorney

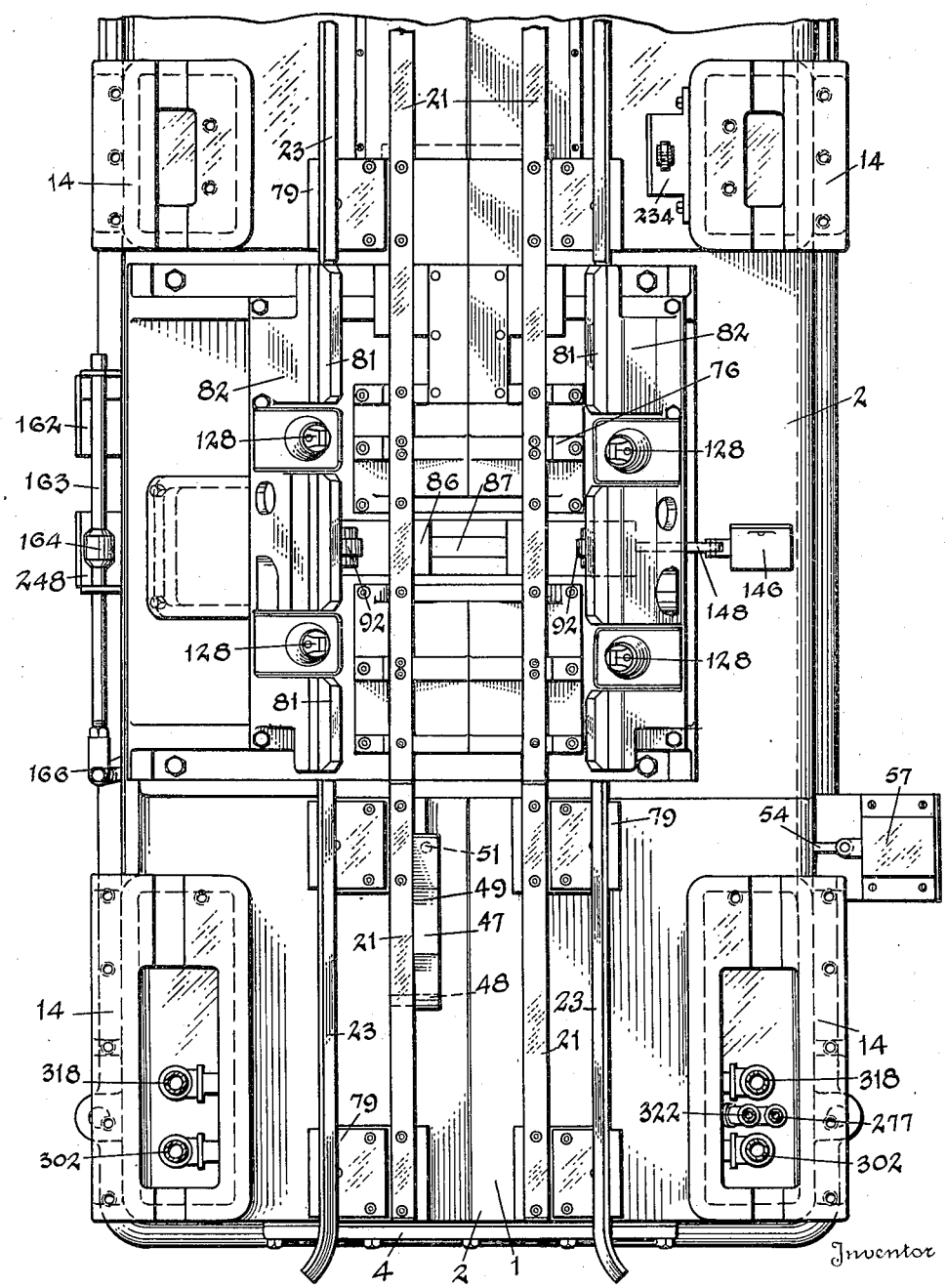

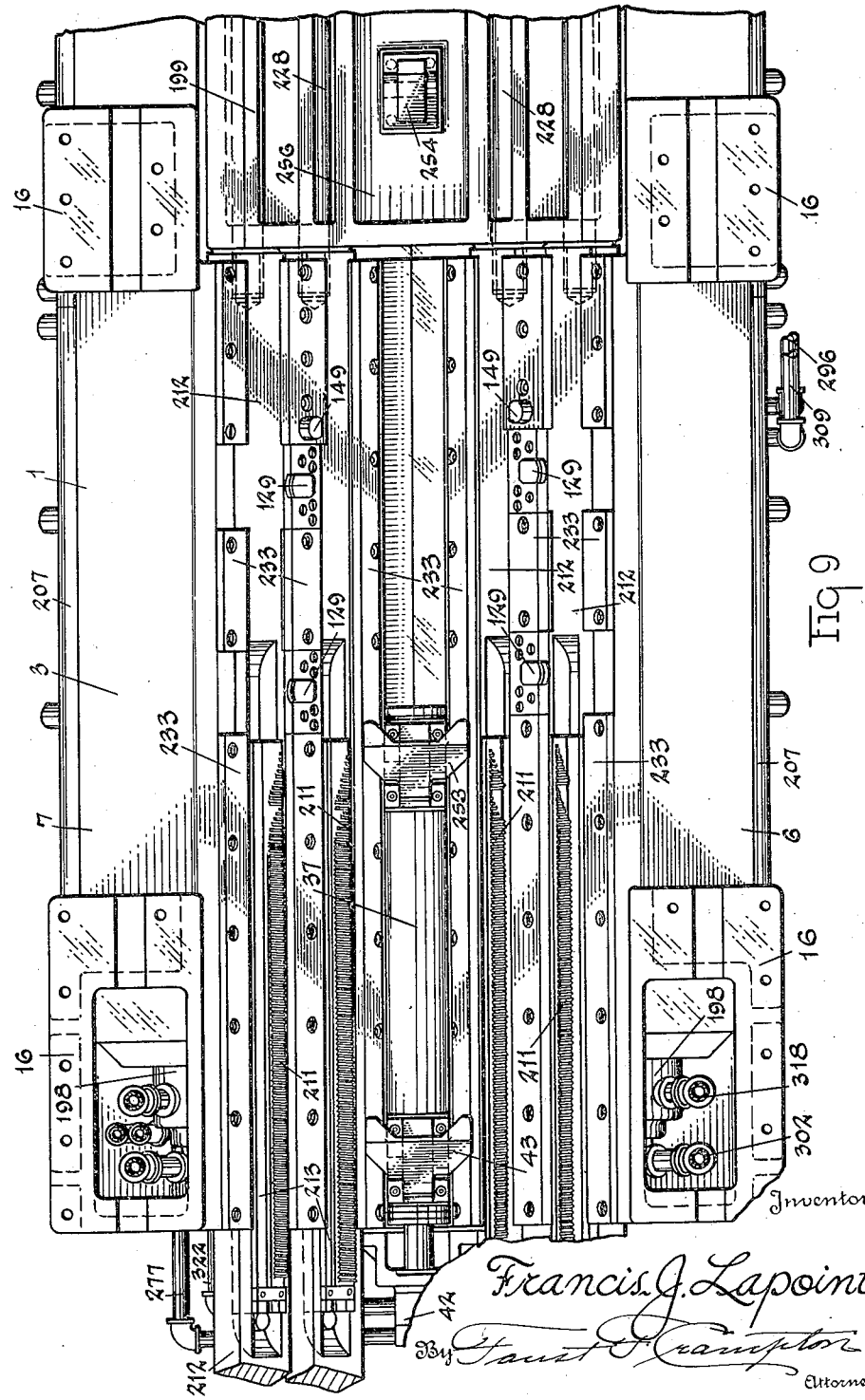

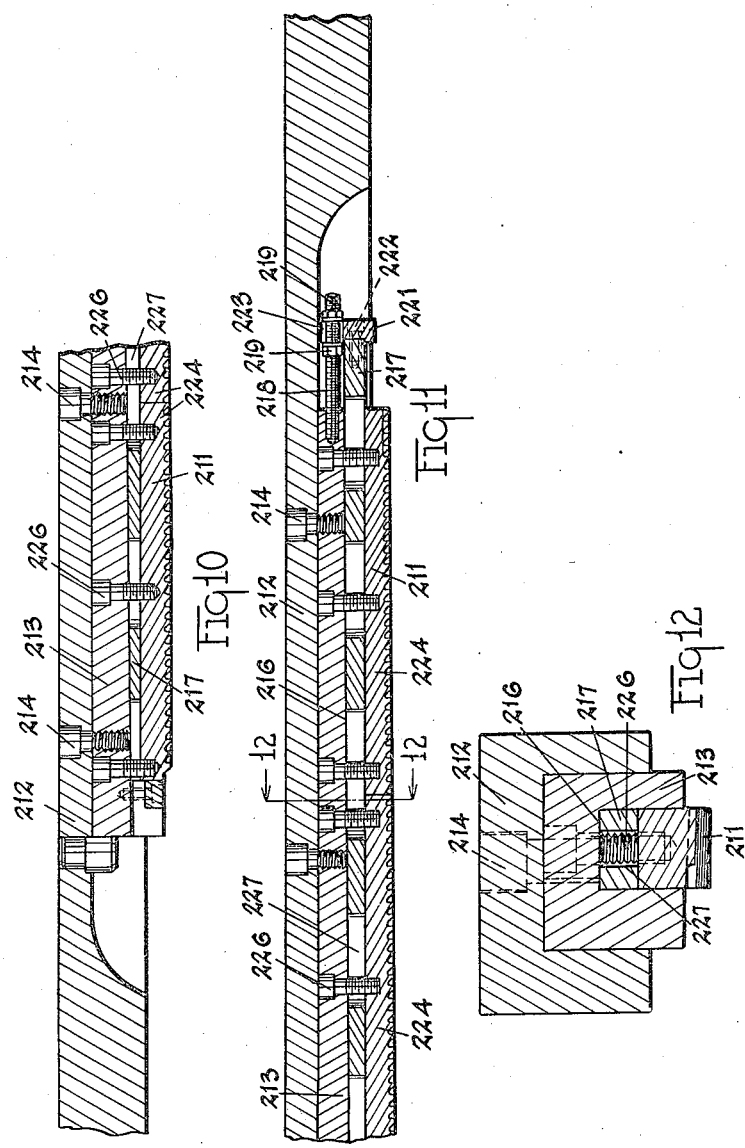

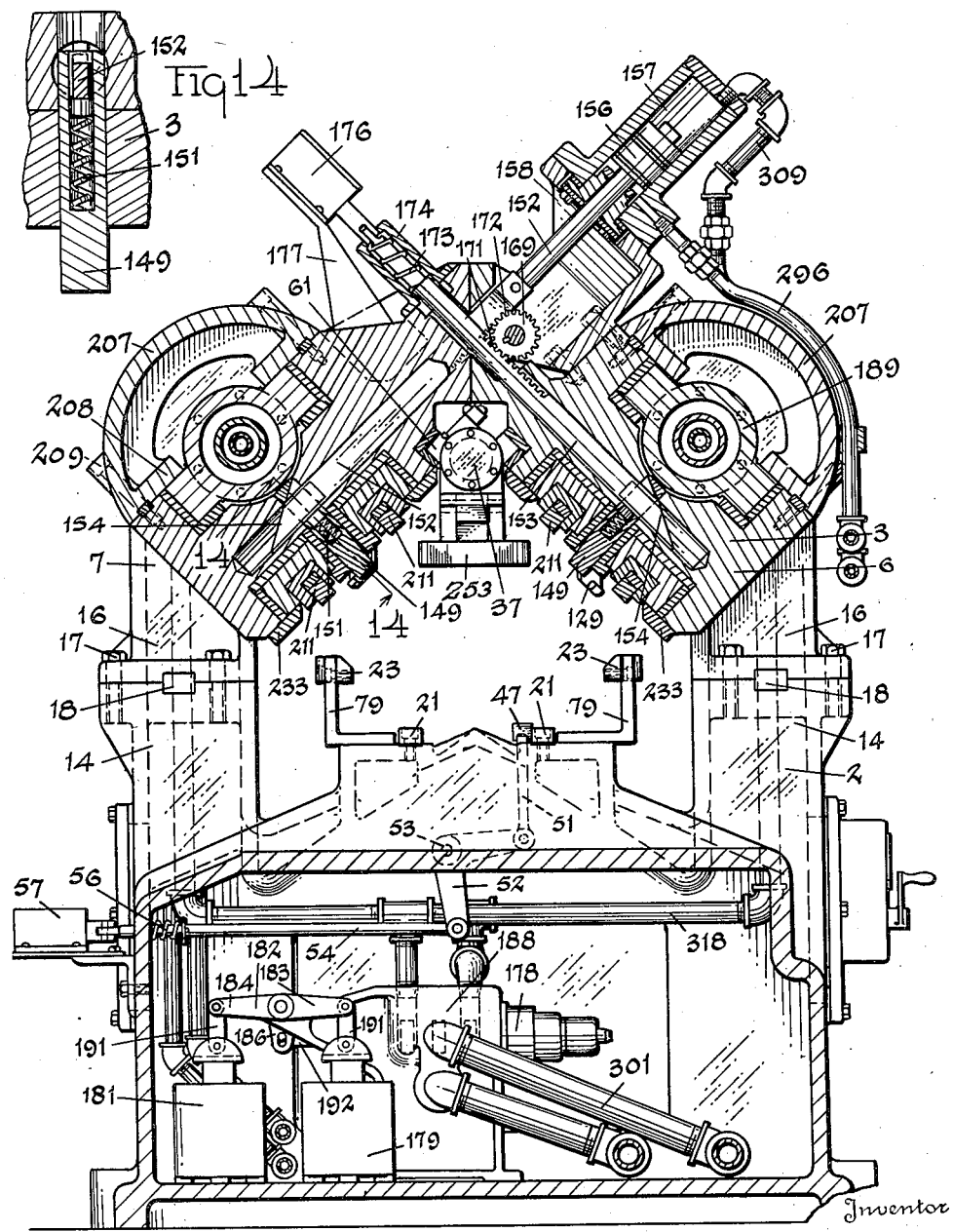

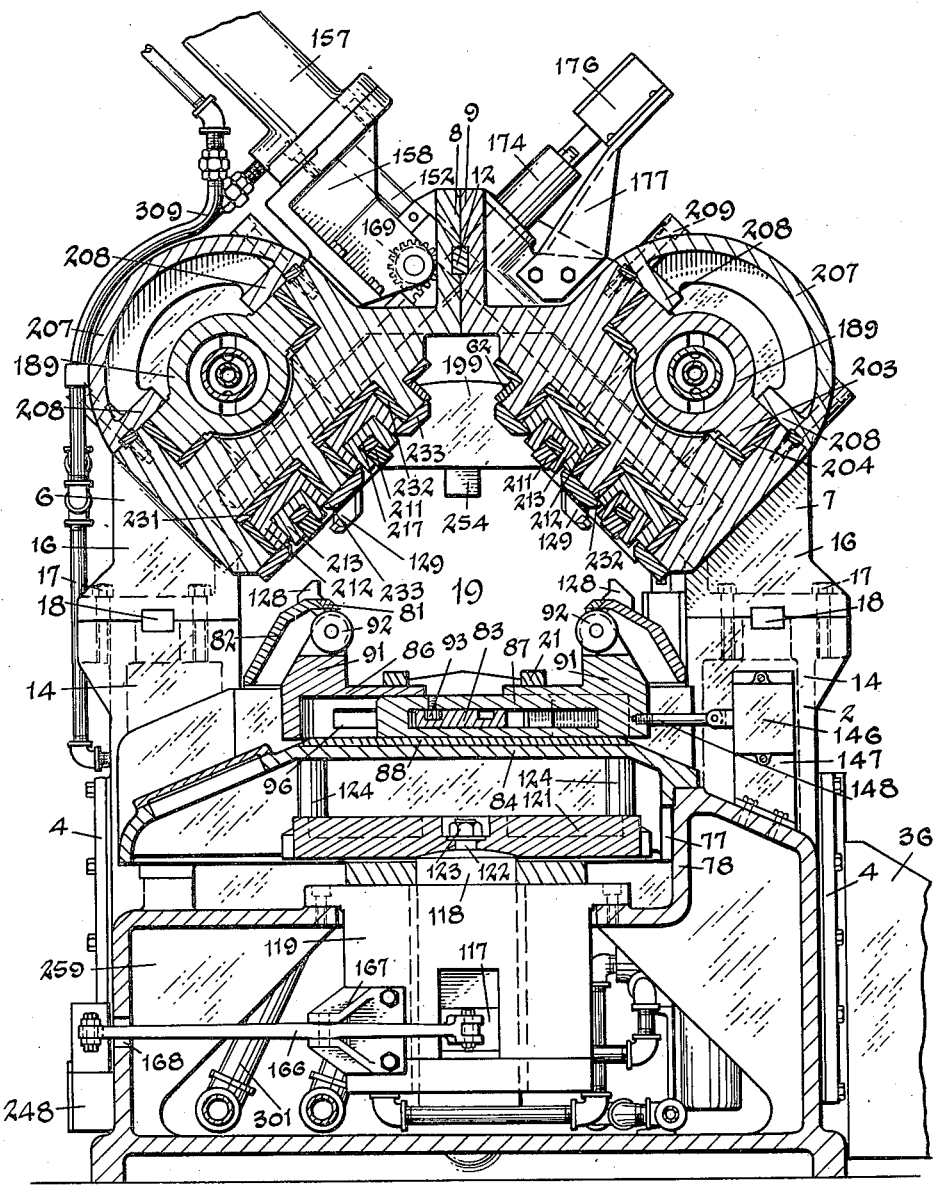

Sept. 13, 1938. F. J. LAPOINTE 2,129,850
SURFACE BROACHING MACHINE
Filed Feb. 17, 1936 16 Sheets-Sheet 11

Inventor
Francis J. Lapointe
By Faust H. Crampton
Attorney

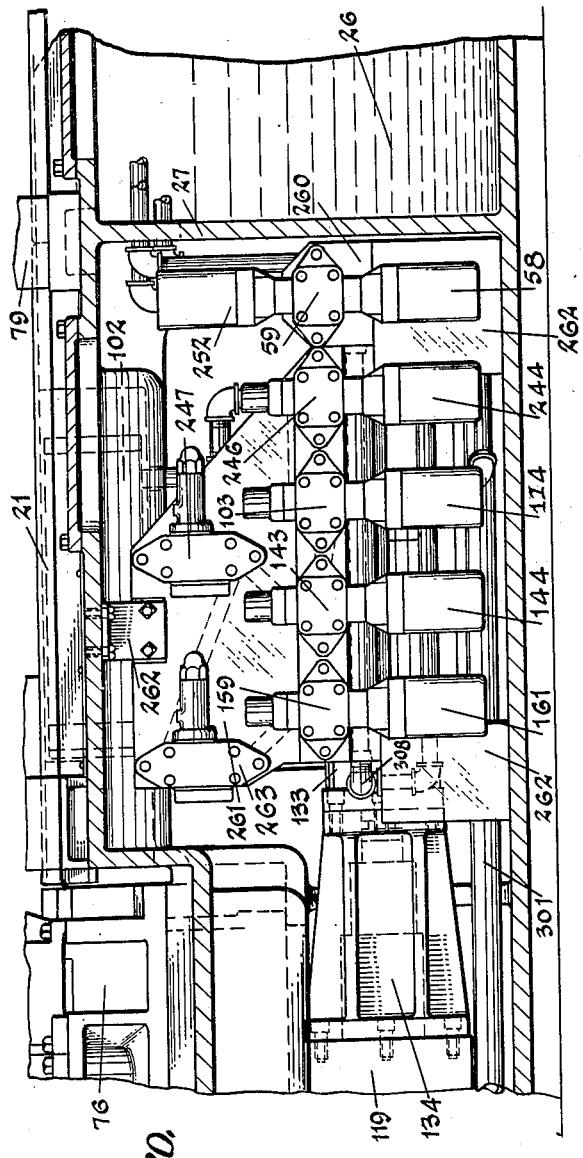

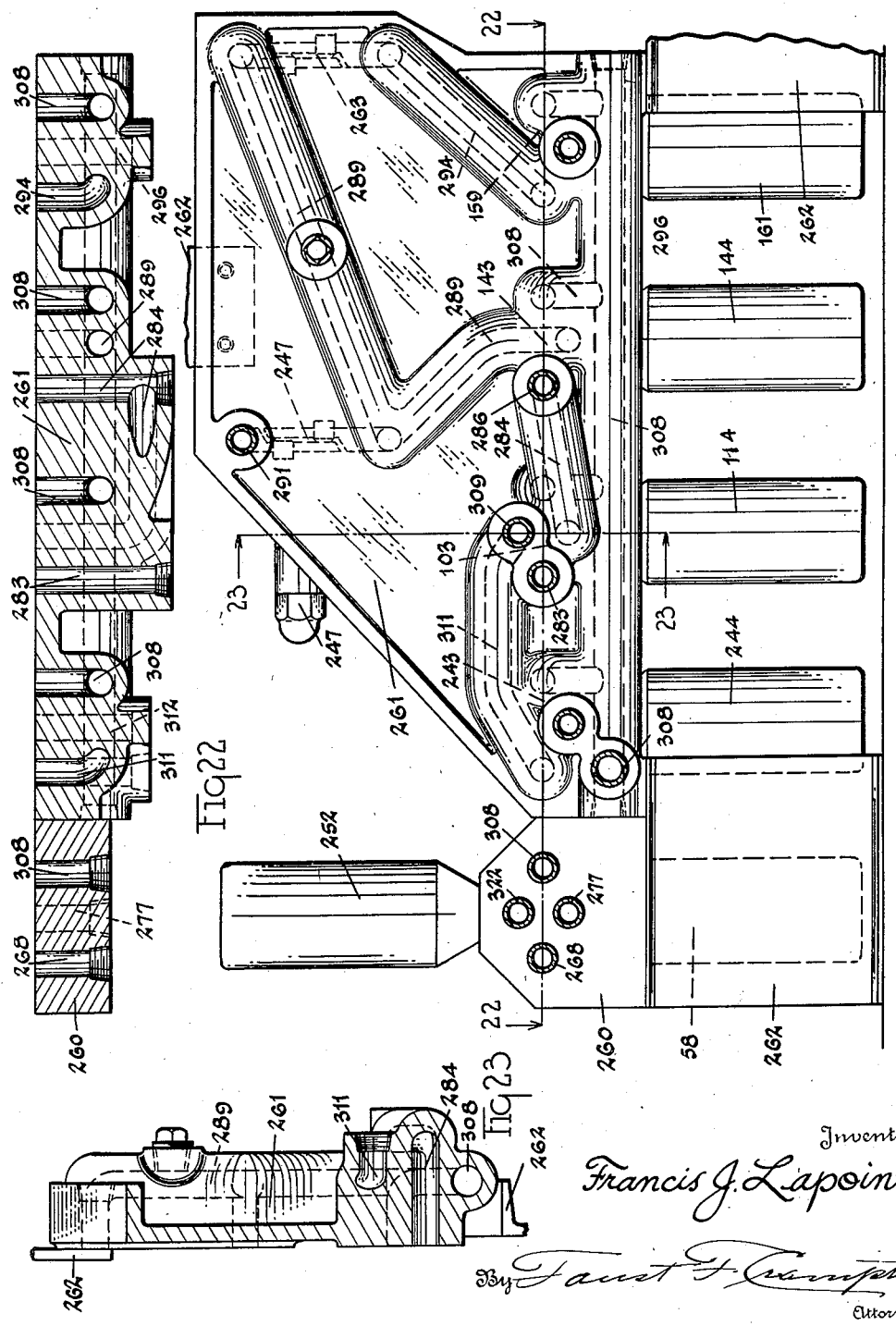

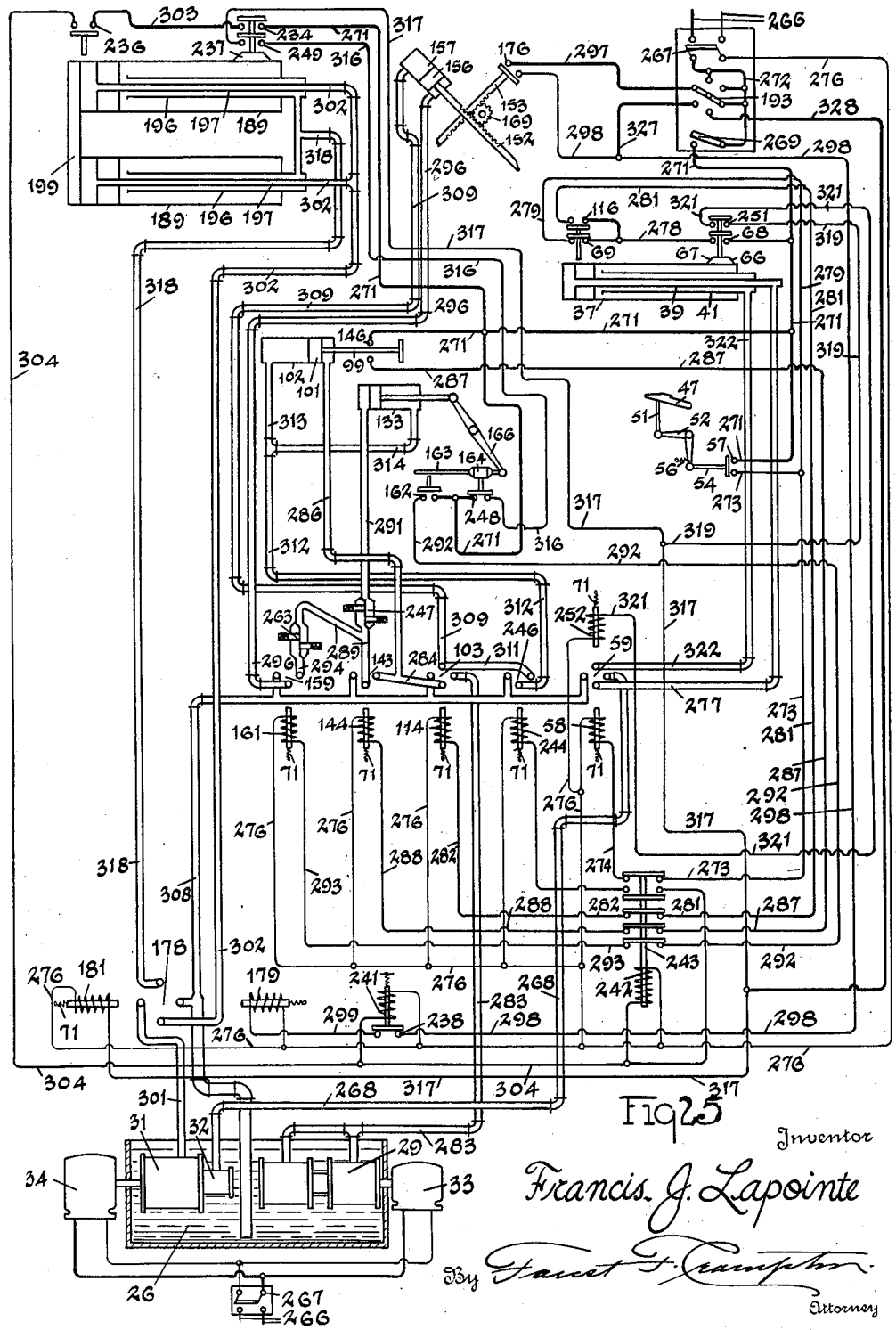

Patented Sept. 13, 1938

2,129,850

UNITED STATES PATENT OFFICE 2,129,850

SURFACE BROACHING MACHINE

Francis J. Lapointe, Ann Arbor, Mich.

Application February 17, 1936, Serial No. 64,232

16 Claims. (Cl. 90—33)

My invention has for its object to provide an efficient broaching machine for surface-broaching articles.

One of the particular objects of my invention is to produce a machine for surface-broaching a plurality of spaced surfaces of an article that extend in general directions forming one or more angles to each other. The surfaces may be of any desired contour. They may be substantially plane surfaces located at any desired angle to each other, or they may be curved or angular surfaces.

The invention also has for its object to provide means for automatically producing a sequence of functions of the machine which is initiated by the location of each article in a machine receiving position and which is terminated by the location of the article in a machine delivery position.

The invention also has for its object to produce an arrangement of valve actuating elements mechanically controlled to produce sequential interdependent hydraulic operations of certain of the machine actuating elements.

The invention also has for its object to produce interrelated structural parts whereby succeeding articles may be rapidly and accurately located in position and broaches may be adjusted and maintained in position and operated to form finished and accurately relatively positioned like surfaces in parts of articles.

The invention also has for its object to provide means for moving the article away from the broach cutting position in advance of the return of the broaches and means for moving the article by the broach actuating elements.

Other features of the invention will appear from the following description and upon examination of the drawings. Structures containing the invention may partake of different forms and may be varied in their details and still embody the invention. To illustrate a practical application of the invention, I have selected a broaching machine as an example of the various structures that contain the invention and shall describe the selected structure hereinafter, it being understood that certain features of my invention may be used to advantage without a corresponding use of other features of the invention and without departing from the spirit of the invention as presented in the claims. The particular structure selected is shown in the accompanying drawings.

Figure 17:
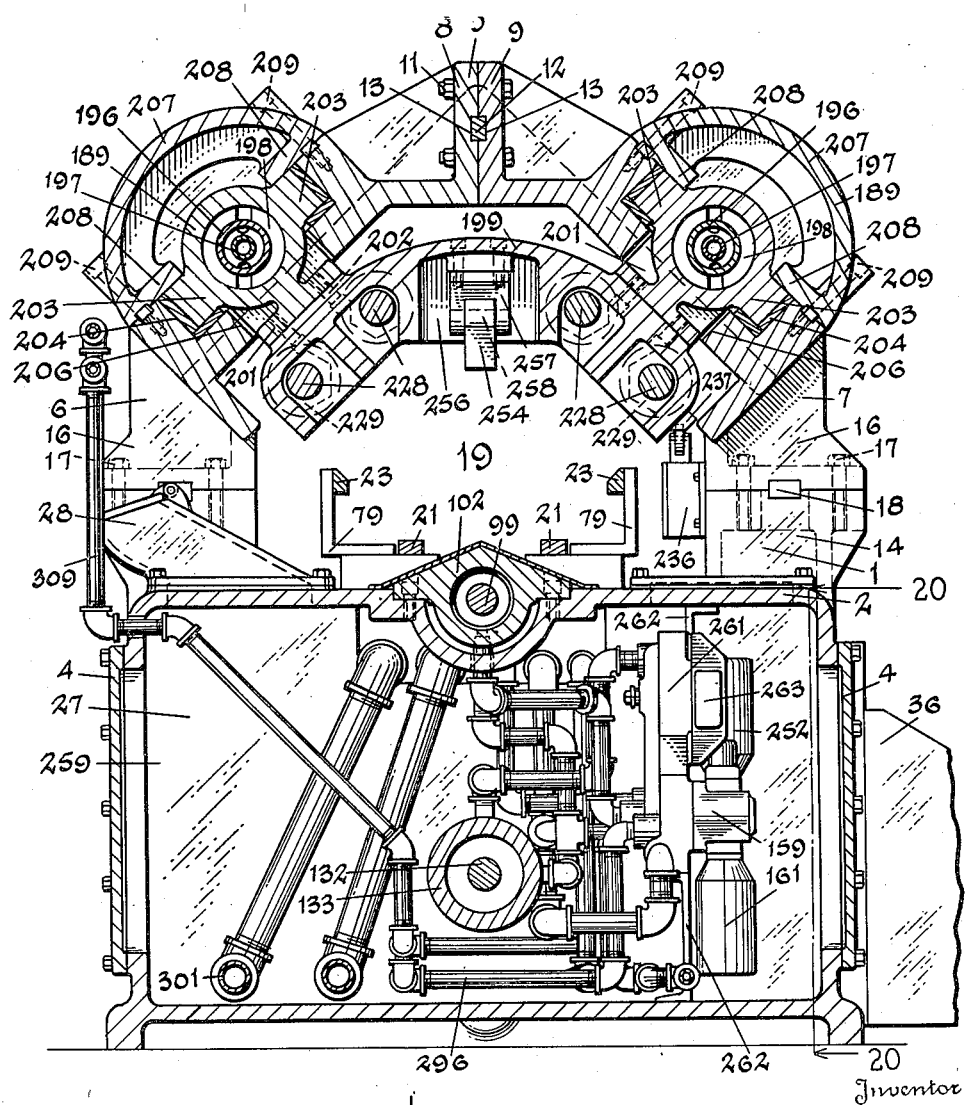
Figure 18:
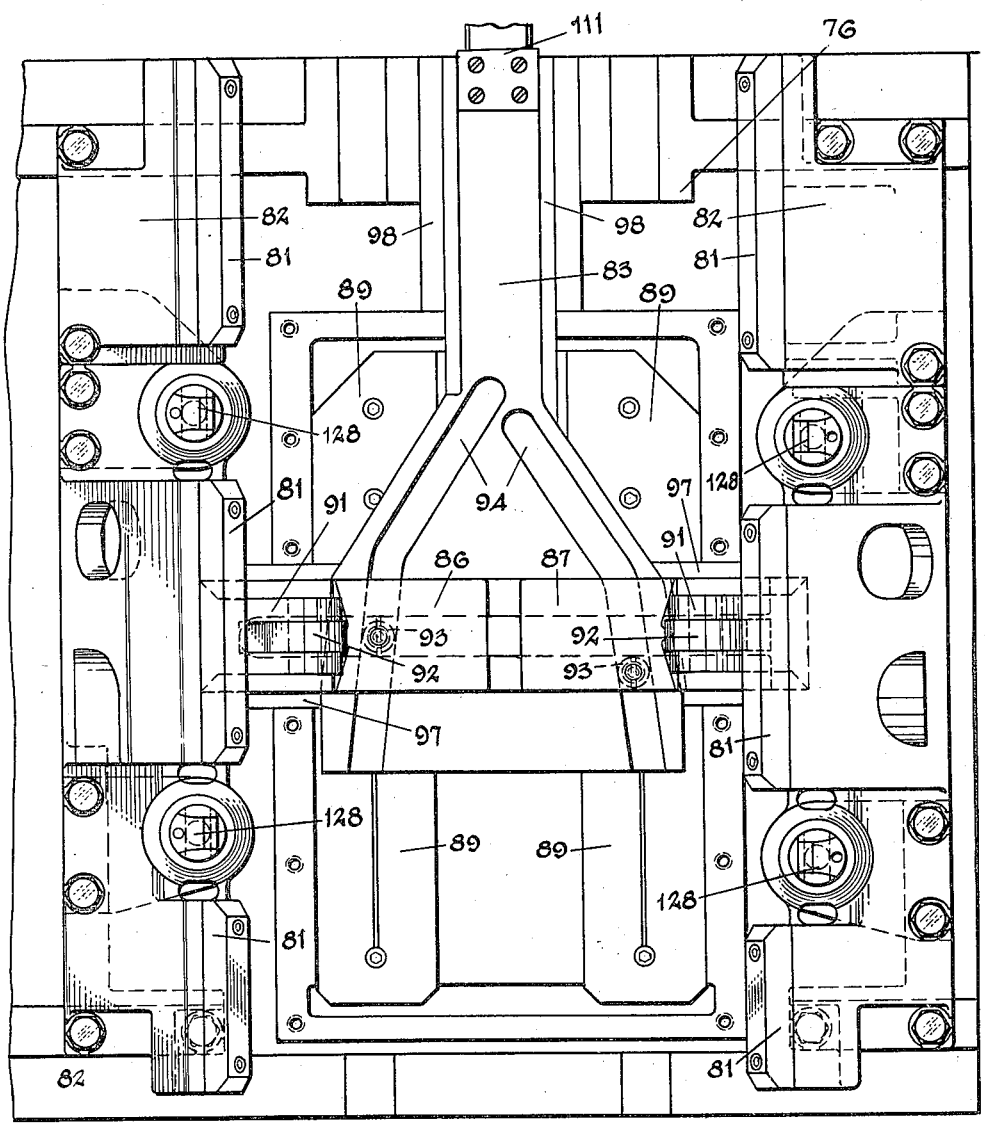
Figure 19:
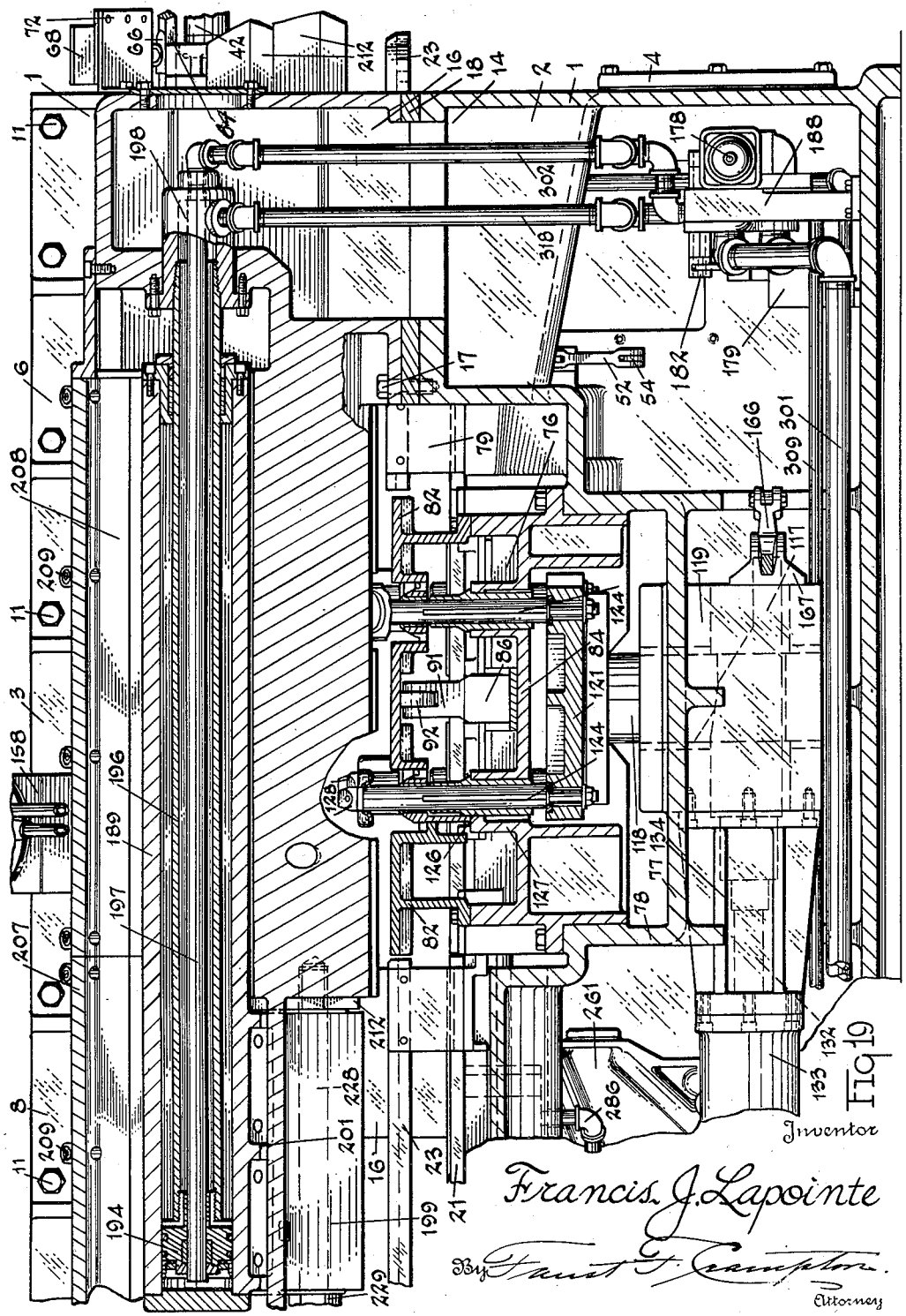

Fig. 1, in the particular form of construction shown in the drawings, illustrates the front end of the machine. Fig. 2 illustrates the rear end of the machine. Fig. 3 illustrates one side view of the machine. Fig. 4 illustrates the other side view of the machine. Fig. 5 illustrates a perspective view showing interiorly disposed parts of the machine. Fig. 6 illustrates a longitudinal section of one end part of the machine taken on the plane of the line 6—6 indicated in Fig. 1. Fig. 7 is a longitudinal section of the other end part of the machine taken on the same plane as that on which the section shown in Fig. 6 is taken. The sections shown in Fig. 6 and Fig. 7 illustrate a complete longitudinal section of the machine. Fig. 8 illustrates a top view of the bed of a part of the machine. Fig. 9 illustrates a view of the part of the frame that is disposed on the bed and forms with the bed an enclosure or tunnel, the view being taken in an upward direction from within the tunnel. Fig. 10 is a view of a longitudinal section of an end part of a broach and a part of its holder. Fig. 11 is a view of similar section of the other end of the broach. Fig. 10 and Fig. 11 together illustrate the longitudinal section of a broach. Fig. 12 is a view of a section taken on the plane of the line 12—12 indicated in Fig. 11. Fig. 13 illustrates a cross-sectional view taken on the plane of the broken line 13—13 indicated in Fig. 3. Fig. 14 illustrates a sectional view taken on the plane of the line 14—14 indicated in Fig. 13. Fig. 15 illustrates a cross-sectional view of the machine taken on the plane of the line 15—15 as indicated in Fig. 4. Fig. 16 illustrates a means for actuating a pair of switches that electrically control the fluid pressure in machine actuating elements. Fig. 17 is a view of the transverse section of the machine taken on the plane of the line 17—17 indicated in Fig. 4. Fig. 18 illustrates a top view of work aligning and clamping parts. Fig. 19 illustrates a longitudinal section of a part of the machine taken on the plane of the broken line 19—19 indicated in Fig. 1, and it illustrates structural details of parts of the machine. Fig. 20 is a view of a longitudinal section of a part of the machine taken on the plane of the line 20—20 indicated in Fig. 17 and also illustrates a side view of a bank of the electromagnetically controlled valves. Fig. 21 illustrates a manifold having fluid communicating parts that connect with electromagnetically controlled valves illustrated in Fig. 20. Fig. 22 illustrates a view of a section taken on the plane of the line 22—22 indicated in Fig. 21. Fig. 23 illustrates a view of a section taken on the plane of the line 23—23 indicated in Fig. 21. Fig. 24 illustrates means for controlling the placement of the article relative to the broach in advance of and subsequent to broach cutting. Fig. 25 illustrates diagrammatically the electric and hydraulic system involved whereby sequential cyclic operations of the machine are automatically produced.

In the particular form of broaching machine illustrated in the drawings, I indicates the frame of the machine comprising the bed 2 and the housing 3 that is supported on the bed. They form a tunnel-like structure in which the broach cutting operations are performed. The machine is provided with suitable removable panels, such as the panels 4, that close or cover chambers formed in the machine by partitioning walls and contain parts of the machine.

The housing 3 is formed of two parts 6 and 7 that rest upon edge portions of the base. The parts of the housing are provided with flanges 8 and 9 that contact with each other when the housing is assembled. The parts of the housing are secured together by the bolts 11 and the key bars 12 which extend through suitable registering key-ways 13 extending substantially the length of the housing. The base 2 is provided with upwardly projecting column-like parts 14, while the housing has corresponding supporting column parts 16 that register with the column parts 14 of the base. The column parts 14 and 16 produce spaced intermediate edge parts of the base and housing. The column parts are interconnected by the bolts 17 and by the keys 18 that are located in key-ways formed in the contacting surfaces of the column parts of the base and the housing.

The machine is adapted to surface-broach planular surfaces disposed in inclined relation to each other. The particular purpose of the machine illustrated in the drawings is to produce accurately formed and positioned surfaces of reference on metal articles or parts for subsequent accurate machining and disposition of surfaces that determine the location of parts secured to the part having the surfaces of reference, such as in the manufacture of internal combustion engines. In the V type of engines, pads are formed at the corners of the blocks and at points intermediate the corners, and four broaches may be used to produce eight surfaces of reference, each broach accurately finishing two of the surfaces in each operation of the machine. The planes of the edges of the teeth of the broaches are inclined with respect to each other to form surfaces on the block that are correspondingly inclined.

The article may be inserted in position by endwise insertion into the tunnel-like machine, or it may be inserted cross-wise either from above or below or sidewise into the tunnel through a suitable opening or passageway, or it may be inserted both cross-wise and lengthwise. Likewise, the article may be delivered from the machine by lengthwise movement or cross-wise movement or both and at any desired point.

Each article, such as an engine block or the like, is inserted into the end of the tunnel 19 formed by the bed 2 and the housing 3. The article is placed on the supporting rails 21 located on the base 2. The rails 21 are divided into sections 22 and extend the length of the tunnel of the machine. The machine is also provided with guide rails 23 located on the sides of the tunnel, which guide the article to maintain it in substantially central relation with respect to the lower side of the tunnel 19 as it is moved into the tunnel. The guide rails 23 are also divided into sections 24 and extend the length of the tunnel. The rails 23 may, if desired, protrude from the receiving end of the tunnel and may be curved laterally to guide the article to the central part of the opening of the tunnel.

As the articles are sequentially placed in position at the receiving end of the machine, they close a circuit that causes the sequential hydraulic operation of the actuating elements of the machine by the sequential completion of the controlling electric circuit and operation of electro-magnetically operated valves upon predetermined movement of the elements.

Preferably, oil is used as the fluid in the hydraulic operation of the system. The oil reservoir 26 is located in one end of the base 2 and is formed by the partitioning wall 27. It is provided with a filling spout 28, and suitable pipes are connected to the actuating elements for returning the oil thereto. The pumps 29, 31, and 32 are located in the reservoir, and, by the operation of the motors 33 and 34, the oil is drawn from the reservoir to produce a supply of oil under pressure that is directed by valves to cylinders as required. The motors 33 and 34 are supported on the bracket 36 which is secured to the side of the base 2.

The articles are hydraulically moved into approximate broach cutting position by means of a cylinder 37 having a fixed piston 38. The cylinder 37 is located at the top of the work receiving end part of the tunnel 19. The cylinder is moved relative to the fixed piston 38, which is connected to the oil supply pipes 39 and 41 that are connected to a head 42 mounted on the housing 3. The head 42 is provided with passageways that communicate with the pipes 39 and 41.

The oil under pressure is directed to one or the other of the end portions of the cylinder through the coaxial pipes 39 and 41 to move the cylinder. When the article is inserted in position in the receiving end of the tunnel, it is moved manually, or otherwise, past a work engaging dog 43 that is pivotally supported on the end of the cylinder 37 by means of the pin 44 from which the dog depends. The dog is tilted inwardly as the article is moved inwardly from the end of the machine, and the dog drops behind the article to engage the article when the cylinder is moved. The dog is formed T-shape and is provided with a stop 46 to limit its return movement. The cross end part of the T-shaped dog is thus placed in position to engage an upper end part of the article.

As the article is moved past the dog 43, it engages the lever 47 that is pivotally supported by the pin 48 on one of the supporting rails 21. The lever 47 has a cam surface 49 that is engaged by the article to depress the lever and to operate a rod 51 that operates a bell crank lever 52, pivotally supported on the base 2 by the pins 53 (Fig. 13). The bell crank lever 52 in turn operates a rod 54 that is spring pressed by means of the spring 56 to maintain the lever 47 normally in its uppermost position, that is, in position to be engaged by the article when the article is moved past the dog 43. The rod 54 extends through the side wall of the bed 2 and operates a switch 57. The spring 56 is located intermediate the side wall of the base 2 and a washer shouldered on the rod 54 and operates to return the rod and the parts connected thereto when the article is moved to release the lever 47. The switch completes a circuit from a suitable source of supply of electric current through the solenoid 58 that operates a valve 59 which directs oil from the source of supply under pressure to the end of the movable cylinder 37 located remote from the receiving end of the tunnel to move the cylinder inwardly. The cylinder 37 is provided with a pair of supporting ridges 61 that slide along the bearing plates 62 located in V-shaped channels 63 formed in the housing 3. The movement of the cylinder 37 thus moves the article to the region wherein the article is secured in accurate position for the broaching operation.

To maintain the flow of the fluid through the valve 59 to the cylinder 37 after release of the lever 47 by the initial movement of the cylinder, a rod 64, having the cams 66 and 67, is suitably connected to the cylinder 37 (Fig. 24). When, therefore, the cylinder 37 moves forward, the cam 66 operates a switch 68 that closes a by-pass to the switch 57 in advance of the release of the lever 47. The switch 68 maintains the circuit through the solenoid 58 closed to maintain the valve 59 in the position to which it has been moved by the operation of the operation of the solenoid 58 until the cam 67 located on the rod 64 operates the switch 69 to open the circuit of the solenoid 58. The valve 59 is spring pressed by counteracting springs 71 that operate to return the valve to its normal position when the circuit is opened. The pressure in the cylinder 37 is discontinued upon the operation of the switch 69 by the cam 67 on the rod 64.

The switches 68 and 69 are supported on brackets 72 which are connected to the end of the housing 3. The switches 68 and 69 are provided with rollers 73 that are mounted upon suitable spring pressed rods 74. The switches are closed by engagement of the cams 66 and 67 with the rollers 73.

The article has now been pushed to a position where the parts to be broach-cut may be accurately aligned with the broaches. The machine is provided with a fixture 76 supported in a recess or well 77 formed by the walls 78 located centrally in the bed 2. The sections 24 of the guide rails 23 are supported on brackets 79 located on the base 2 at the receiving end and delivery end of the machine, while the sections 81 of the rails 23 are mounted on the bracket parts 82 of the fixture. The rails 23 guide the article in position onto the fixture 76 and from the fixture to the delivery end of the tunnel.

The fixture 76 is provided with a wall 84 that forms chambers above and below the wall. On the wall 84 and in the chamber above the wall are located bars 86 and 87 that interfit and interslide relative to each other. The bars 86 and 87 are slidably supported on a wear plate 88 extending cross-wise the length of the machine (Fig. 15). The bars 86 and 87 are provided with the arms 91. Rollers 92 are mounted in the upper ends of the arms 91 and are located above the level of the sections 22 of the supporting rails 21 and in position to engage opposite sides of the article. A cam plate 83 is slidably supported on wear plates 89 that are also supported on the partitioning wall 84.

The bars 86 and 87 are provided with registering slots 96, and the plate 83 is located in the slots 96 and is movable therethrough in a cross-wise direction. The bars are guided by wear plates 97, and the plate is supported by the wear plates 98 in their respective movements.

The bars 86 and 87 are provided with rollers 93 located in relatively inclined channels 94 that are formed in the plate 83 (Fig. 18). Upon sliding movements of the plate 83, the relative inclined channels operate to slide the bars 86 and 87 transverse to the longitudinal axis of the machine and so as to either move the rollers 92 towards each other or to separate them. When the plate 83 is moved to the right and is positioned as shown in Fig. 18 of the drawings, the rollers 92 are drawn towards each other equidistantly to engage the sides of the article and move the article cross-wise to locate it centrally with respect to the bottom of the tunnel.

The plate 83 is connected to a piston rod 99 which is connected to a piston 101 located in the cylinder 102. The piston rod 99 is connected to the plate 83 by means of the slip connector 104 having a block 106 that is connected to the piston rod 99 by a threaded shank 107. The plate 83 and the block 106 are provided with recesses 108 and 109, respectively. A plate 111 is secured to the plate 83 and has protruding end edge parts 112 which extend into the recesses 108 and 109. The recess 108 has a dimension extending in the direction of the piston rod 99 which is considerably greater than the end part 112 of the plate 111 and, therefore, provides a sliding connection as between the block 106 and the plate 111 with the result that the piston 101 produces initial free forward and back movement without moving the plate 83, which gives opportunity for the piston to develop a considerable rate of movement in advance of making positive connection through the connector block 106 with the plate 83 which operates, particularly in the releasement of the article, to jar open the rollers 92. The block 106 may be provided with a pin 113 that extends into an opening formed in the end of the plate 83 to maintain a fixed relation between the piston rod 99 and the plate 83.

The cylinder 102 is supported in a recess formed in the base 2 and in alignment with the plate 83. The pressure in the cylinder is controlled by a valve 103. The valve 103 is operated by means of a solenoid 114 which is connected to the source of supply of electric current by means of a switch 116 which is closed when the switch 69 is operated to open the circuit of the solenoid 58. Thus, when the cylinder 37 moves the article into position on the fixture 76, the valve 103 directs the fluid pressure to a portion of the cylinder on one side of the piston 101 to move the plate 83 to the right, when viewing the parts of the machine shown as in Figs. 6 and 7, and cause the rollers 92 to move the article to its proper position for subsequent alignment, and then clamp the article.

The article is then raised by means of a cam 117 that operates upon a coacting cylindrical cam block 118 which is guided in the bearing block 119 that depends from and extends through the wall 78. The bearing block 119 is provided with a slot 131 in which the cam 117 is slidably mounted. The bearing block is supported on the bottom of the wall 78 and is secured in position to the wall 78 by means of the screws 136. The cam block 118 is connected to a plate 121 by means of the stud 122 and the nut 123. Four upwardly extending rods 124 are secured to the corners of the plate 121 and are slidably guided by the wall 84 of the fixture 76. The ends of the rods 124 are located in the corners of the plate 121 and extend vertically at points on opposite sides of the arms 91 and outside of the plate 83. They are located in bushings 126 supported in bosses 127 formed in the wall of the fixture and consequently as the rods 124 are raised, they lift the article from the sections 22 of the supporting rails 21 as guided by the rollers 92.

The upper ends of the rods 124 are provided with heads 128 that engage parts of the article, such as flange parts or corners or other definitely disposed parts formed on the article, when the article is raised by the cam 117 and the cam block 118. The housing 3 is provided with adjustable aligning anvils 129 located above the heads 128 and which coact with the heads 128 and surfaces formed in the article to clamp the article in accurate alignment with respect to the broaches when the article is raised.

The cam 117 is connected to the piston rod 132 which is in turn connected to a piston located in a cylinder 133. The cylinder 133 is supported on the brackets 134 that are secured to the bearing block 119. The piston rod 132 is connected to a cylindrical block 137. The end of the piston rod 132 is threaded, and the block 137 is correspondingly tapped for interconnecting the block with the piston rod. One end of the block is located in the bushing 138. The block 137 is provided with the shoulder 139 while the bushing has an inturned flange part which engages the shoulder. The block 137 is also provided with a pin 141 located in an opening formed in the end of the cam 117. The pin 141 operates to maintain the piston rod 132 and the block 117 in alignment. The bushing 138 is threaded and is connected to a boss 142 formed on the end of the cam 117.

The pressure of the oil in the cylinder 133 is controlled by means of a valve 143 which is operated by means of the solenoid 144. The solenoid is controlled by a switch 146 suitably supported on a bracket 147, and the slide bar 87 is connected to the switch by a rod 148. When the plate 83 reaches substantially the limit of its stroke by the clamping action of the rollers 92, the switch 146 is operated to close the circuit of the source of supply of electric current through the solenoid 144 to operate the valve 143 and cause the operation of the cam 117 to raise the cylindrical cam block 118 which raises the article and clamps it against the fixed aligning anvils 129.

In order to prevent movement of the article from its position of alignment in which it is disposed by the operation of the cylinders 102 and 133, a pair of movable work engaging pins 149 are slidably supported in the housing 3 and engage the forward end part of the article to prevent movement of the article with the broaches as they cut the parts of its surface.

The pins 149 as shown in Figs. 13 and 14, are spring pressed by springs 151 located in sockets formed in the pins. The pins 149 are slotted in the upper ends, and the slots are provided with end surfaces that are inclined to their axes. Rods 152 and 153 extend cross-wise to each other and through the side parts of the housing 3 and through the slotted parts of the pins 149. The rods 152 and 153 are slidably supported in the housing. The ends of the rods are provided with inclined surfaces 154 that coact with the inclined surfaces of the ends of the slots of their respectively associated pins 149 to release the pins and permit the springs to depress the pins as the rods are withdrawn.

The rods 152 and 153 are operated by a piston 156 located in the cylinder 157 that is mounted on the housing by means of a bracket 158. The rod 152 is connected to the piston rod and operates the rod 153 by racks and a gear. The source of supply of fluid to the cylinder is controlled by means of a valve 159 that is operated by a solenoid 161. The solenoid 161 is electrically controlled by means of a switch 162 suitably supported on the housing 3. The switch 162 is operated by the cam 117 upon the completion of its sliding movement to clamp the article in position of alignment with the broaches. A bar 163, provided with an adjustable cam 164 is connected to the block 117 by means of a lever 166. The lever 166 is pivotally supported on the bearing block 119 by means of the bracket 167. The lever 166 extends through a slot 168 formed in the side wall of the bed 2 of the machine and is connected at its outer end to the rod 163.

When, therefore, the cam block 118 substantially completes its upward movement, the cam 164 is moved into engaging relation with respect to the switch 162. The switch 162 is provided with a roller which, when depressed by the cam 164 operates to close the switch and complete the circuit of the solenoid 161 with the source of supply of electric current and cause the valve 159 to connect the source of supply of fluid under pressure to one end of the cylinder 157 to draw the rod 152 outwardly with respect to its associated slotted pin 149 and permit depression of the pin by the operation of the spring 161.

The rod 153 is also provided with an inclined end portion 154 that is located in the slot of its associated pin 149 and as the rod is withdrawn, the spring 151 operates to depress the pin. The rod 153 is operated by the gear wheel 169 that meshes with a rack 172 formed in an edge part of the rod 153, and also meshes with a rack 172 formed in an edge part of the rod 152. The gear wheel 169 is supported on a suitable shaft journaled in the bracket 158. Thus, when the rod 152 is pulled outward, the gear wheel 169 is rotated in a direction to cause the rod 153 to be drawn outward also, so that the pins 149 are released simultaneously and descend into position to engage the forward, upper edge of the article and prevent the work from following the broaches during the cutting operation.

When the rod 153 is moved outwardly by the operation of the piston 156, it compresses a spring 173 that operates to hold the parts that interconnect the rods in close engaging relation. The spring 173 is located in a sleeve 174 and engages at one end an inturned flange formed on the sleeve and a shoulder formed on the rod 153. The rod also operates a switch 176. The switch 176 is supported on the bracket 177 which is secured to the housing 3. The switch 176 electrically controls the circuit of a solenoid that operates a valve 178 to initiate the broach-cutting operations.

The movable member of the valve 178 is moved in one direction by a solenoid 179 and in the opposite direction by a solenoid 181 and in each case, counter to one or the other of the counteracting springs 71. The solenoids 179 and 181 operate upon the valve 178 through a bell crank lever 182 having arms 183, 184, and 186. The solenoid 181 is connected to the arm 184. The solenoid 179 is connected to the arm 183, and the movable valve member of the valve 178 is connected to the arm 186. The bell crank lever 182 is pivotally supported on a bracket 187 that is connected to the frame 188 of the valve 178 which is mounted on the bottom of the base 2. Thus, the valve 178 is operated to and from its normal position by means of the solenoids 179 and 181 to direct the flow to and from the cylinders 189. The cores of the solenoids 179 and 181 are connected to the arms 183 and 184 by means of the links 191, while the movable valve member of the valve 178 is connected to the arm 186 by means of the link 192.

The switch 176 is connected to a manually operable switch 193 that connects the switch 176 with the source of supply of electric current. The solenoid 179 operates the valve 178 to direct the flow of fluid under pressure to the cylinders 189. The cylinders are located in the housing 3, one being in the part 6 and the other in the part 7 of the housing.

The cylinders 189 move with reference to their pistons 194 that are secured in their positions by means of the coaxially located pipes 196 and 197 that connect the piston with the fixed head 198. (Fig. 19.) The head 198 has suitable passageways that communicate respectively with the pipes 196 and 197 and connect the ends of the cylinders through suitable pipes with the valve 178 which controls the flow of the fluid to and from the cylinders.

The cylinders 189 are interconnected by means of a tie bracket 199 that is bolted to bosses 201 formed on the ends of the cylinders by means of the bolts 202. The cylinders 189 are located in slots 206 formed in the side parts of the housing 3 and are provided with extending flanges 203 that are slidably supported in ways 204 formed in edge parts of the slots. The bosses 201 extend inwardly into the housing through the slots 206. The slots are closed, and the cylinders are covered by substantially semi-cylindrical cover plate 207. The cover plates 207 are provided with flanges 208 that form lateral side walls of the ways 204. The cover plates 207 are bolted to the housing 3 by means of the bolts 209.

The broaches are connected to the tie brackets that interconnect the cylinder 189. The broaches 211 are mounted on the carriers 212 and are set into broach holders 213. Each carrier is formed channel-shape, and the holders are secured therein by means of set screws 214. Each broach holder is also formed channel-shape and has dimensions that vary according to the dimensions of the broach.

The walls of the holder and carrier may be formed to have different thicknesses in order to locate the broaches in desired positions laterally with reference to the parts of the article to be broach-cut. Also, if desired, the bottom surface of the channeled part 216 of the holder 213 may be inclined longitudinally away from the direction of the movement of the holder to dispose the plane of the edges of the teeth of the broach as may be required to produce desired cutting rates per unit lengths of the broach or the bottom surface of the holder may be inclined with respect to the direction of movement of the holder and the sides of the holder may be inclined laterally with respect to the movement of the holder to produce the desired cutting rate and the desired shearing, or if desired, the holder may be formed to produce both results. Where sectional broaches are used, corresponding parts of the holder 213 may be formed to locate the sections to produce the said results.

If desired, a bar having oppositely disposed relatively inclined surfaces may be located intermediate the bottom of the channel of the carrier and the broach to adjustably dispose the broach. Where the plane of the edges of the teeth is parallel to the rear or opposite surface of the broach, the opposed surfaces of the wedge bar 217 may be inclined relative to each other to incline the plane of the cutting edges to produce desired cutting rates per unit length of the broach. Thus, the wedge bars may be substituted, one for the other, to adapt the machine to vary the rate of cutting according to the character of the metal of the article.

The wedge bar may also be adjustably mounted in order to vary the inward location of the plane of the cutting edges of the teeth with respect to the tunnel. The relative inclination of the longitudinal surfaces of the wedge bar 217 may be the same as the relative inclination of the bottom surface of the channel 216 where the plane of the edges of the teeth is inclined to the rear surface of the broach.

In the particular form of construction shown, the bottom surface of the channel 216 of each holder is inclined longitudinally, the inclination being such as to deepen the channel at the leading end of the broach. The wedge bar 217 has longitudinal surfaces on opposite sides thereof, inclined relative to each other to adjust, as may be desired, the location of the plane of the edges of the teeth outwardly from the holder.

Each of the wedge bars is connected to its related holder 213 by means of a threaded stud 218 having the adjustable nuts 219. The wedge bar is connected to a block 221 by means of the set screws 222. The block 221 is slotted as at 223, and the stud 218 projects therethrough. The nuts 219 are located on opposite sides of the block and may be adjusted to adjust the location of each wedge bar with respect to its broach holder to vary the location of the plane of the edges of the teeth. Thus, when the teeth of the broach are sharpened and the broaches are reinserted in position, the plane of the edges of the teeth may again be accurately adjusted inwardly with respect to the tunnel and with reference to the surfaces to be produced on the article.

The broaches in the machine may partake of different forms according to the character of the work that is to be performed. If desired, one or more of the broaches may be formed of a plurality of sections 224 located in endwise abutting relation, and the sections may be connected to the broach holder by means of the screws 226 that extend through the slots 227 formed in the wedge bar 217. The sectional form of the broaches enables ready adjustment as to the length of the broaches. It also enables ready grinding and sharpening of the broach teeth of the sections, and where the planes of the cutting edges are parallel to the backs of the sections, they may be placed at different points in the holder where their gradual dulling will not affect the quality of the work performed by the broaches. Also, the use of the wedge bars, each having varying inclination of opposite longitudinal surfaces, enables the use of a variable number of sections to vary the broach lengths according to the cutting rate per unit length of the broach that is permissible in connection with articles formed of different kinds of metal.

The carriers 212 are secured to the tie bracket 199 that connects together the cylinders 189 by means of the tie rods 228. The ends of the carriers are located in abutting relation with a side surface of the tie bracket, and the tie rods 228 are threaded into the tapped openings formed in the ends of the broach carriers 212 and extend through the tie bracket 199 and are secured by means of the nuts 229. The carriers are supported in guide ways or channels 231 formed in the housing 3, which may be provided with suitable wear plates 232. The carriers 212 are secured in sliding relation with respect to the housing by means of the bolster plates 233 that are bolted to the wall of the housing 3.

Thus, as the cylinders 189 operate, they draw the broaches in a direction away from the receiving end of the machine. As the broach cylinders 189 initiate their movement, a switch 234 is closed which completes the circuit from a source of supply of electric current to the switch 236 which is closed upon the completion of the stroke of the cylinders. A cam 237 is secured to the tie bracket 199 which operates the switches 234 and 236 to close them sequentially, the former at the initial part of the stroke of the cylinders, and the latter at the completion of the stroke of the cylinders. The cam 237 may be adjusted as to its relative location to vary the extent of the stroke of the cylinders in keeping with the variation of the length of the broach for economy of time of operation of the machine. Thus, the switch 236 completes the circuit through a relay switch 238 which is normally maintained closed by means of the spring 239. The current through the solenoid 241 of the relay switch 238 operates to open the switch 238 which disconnects the solenoid 179 which was closed by the switch 176 upon the outward movement of the rod 153 actuated by the pressure in the cylinder 157 that positions the work engaging pins 149. The solenoid 179, when energized, maintains the valve 178 open, and upon opening of the relay switch 238, the valve 178 is closed by the counteracting springs 71.

Also, the closure of the switch 236 operates to close the circuit of a solenoid 242 that operates a multiple switch 243 to open the circuits of the solenoids 58, 114, 144, and 161 and to close the circuit of the solenoid 244. The circuit of the solenoid 58 as described above was closed by the operation of the lever 47 which closed the switch 57 when the article was initially slid into the receiving end of the tunnel 19, and the circuit of the solenoid 114 was closed by the cylinder 37 which closed the switch 116. The solenoid 114 opened the valve 103 to connect the source of supply of fluid with the cylinder 102. The circuit of the solenoid 144 was closed by the operation of the cylinder 102 that closed the switch 146. The solenoid 144 opened the valve 143 to connect the cylinder 133 with the source of supply of fluid. The circuit of the solenoid 161 was closed by the operation of the cylinder 133 that closed the switch 162. The solenoid 161 opened the valve 159 that connected the source of supply with the cylinder 157. Thus, upon the operation of the switch 243, the circuits of the solenoids that have been maintained closed are opened, and the respectively associated valves are restored to their normal positions by the springs 71, and the circuit of the solenoid 244 is closed.

The solenoid 244 operates a valve 246 which connects the source of supply of fluid under pressure with the cylinder 157 to withdraw the workholding pins 149. The valve 246 also connects the source of supply of fluid to the cylinder 102 which separates the clamping rollers 92 by the withdrawal of the cam plate 83. The valve 246 also connects the cylinder 133 with the source of supply, but the return flow of the fluid from the cylinder 133 is through a resistance valve 247 which prevents movement of the piston in the cylinder 133 until the return movement of the piston in the cylinder 102 is completed, that is, until the pressure from the source of supply reaches a point, such as to overcome the resistance to the return movement of the fluid through the valve 247, whereupon the piston of the cylinder 133 is operated which opens the switch 162 and closes a switch 248 by the cam block 164 and lowers the work to the rails 21. Thus, the work is lowered to permit return movement of the broaches by the operation of the cylinders 189. On the return movement of the cam 117 from beneath the cylinder cam block 118, the lever 166 is operated to close the switch 248 by means of the cam 164 located on the rod 163 which is connected to the lever 166. The operation of the switch 243 causes the return movement of the cylinders 102, 133, and 157 since it closes the circuit of the solenoid 244 which operates the valve 246 and connects the cylinders with the source of supply of pressure to cause the return of their pistons until the pistons abut the cylinder heads. The pressure is maintained until the cylinders 189 start their return movement, caused by the operation of the completion of the movement of the piston of the cylinder 133 which closes the switch 248.

By the closure of the switch 248, a circuit is established through the switch 249 to the solenoid 181 which operates the valve 178 to connect the source of supply of fluid under pressure to the cylinders and thus return the broaches. In the initial return movement of the cylinders 189, the switch 236 is opened which de-energizes the solenoid 242 and opens the circuit of the solenoid 244 and by the operation of the spring 71 returns the valve 246 to its normal position which closes the connection of the cylinders 102, 133, and 157 with the source of supply and positions all of the parts in their normal position. The switch 248 also completes a circuit through a switch 251 to a solenoid 252 which operates the valve 59 and connects the cylinder 37 with the source of supply of fluid under pressure and causes the return of the cylinder to its original position for receiving a succeeding article to be subsequently broach cut. When in this position, the cam 66 opens the circuits through the switch 251 and de-energizes the solenoid 252 and by the operation of the springs 71 returns the valve 59 to its normal or closed position and closes the connection of the cylinder 37 with the source of supply of fluid under pressure. Also, upon the return of the cylinders 189, the cam 237 opens the circuits through the switches 234 and 249 and through the solenoid 181, which again returns the valve 178 to its normal position, by the operation of the springs 71, to close the connection of the source of supply of fluid under pressure to the cylinders 189.

The succeeding article to be operated upon is then placed into the receiving end of the tunnel as before, and the lever 47 is engaged thereby to close the connection of the source of supply of fluid to the cylinder 37. The succeeding article to be broach cut is not only moved forward by the cylinder, but the article that has been broach cut in the previous operation of the machine is also moved further along the tunnel 19.

The article broach cut in the preceding operation is engaged by a dog 253. The dog 253 is supported on the inner end of the cylinder 37 in a similar manner to that in which the dog 43 is supported on the outer end of the cylinder. The dog 253 is constructed substantially the same as the dog 43 and is located in position to engage the article that has been lowered to the supporting rails 21. Thus, as the cylinder moves along the tunnel, the article broached during the preceding operation of the machine is moved to a point slightly beyond the tie bracket 199 which is now in its returned position.

The tie bracket 199 is provided with a spring-pressed dog 254 that depends from the tie bracket 199 and in position to engage the object which has been moved along the tunnel toward its delivery end by the cylinder 37. The tie bracket 199 is preferably recessed to produce a light-weight rigid interconnecting member. The dog 254 is located in a central recess part 256 of the bracket. The end of the dog extends into the tunnel sufficiently to engage the rear end part of the article when moved forward by the dog 253 located on the end of the cylinder 37. The dog is pivotally supported on a block 257 by means of the pin 258. It is preferably spring pressed so as to enable movement of the article past the dog, and to engage the object upon a succeeding broach cutting operation when the tie bracket is again moved by the operation of the cylinders 189 toward the delivery end of the machine. The article which has been broach cut is moved to the end of the tunnel by the movement of the cylinders 189 and may be removed therefrom either manually or by any other means. Thus, succeeding articles may be positioned, broached, and removed by the sequential movements of the parts of the machine.

The moving parts of the machine are actuated hydraulically by the control of the valves that connect and disconnect the source of supply of oil under pressure with the cylinders that actuate the parts and also connect the return from the cylinders with the reservoir 26 from which the oil is drawn by pumps. The valves are automatically operated to produce the sequential movements of the actuating parts of the machine by previously operated parts of the machine, whereby there is produced cyclic operations of the machine upon insertion of each article. The valves are preferably located in the chamber 259 and may be suitably supported on a panel or manifold 261 secured in position in the chamber 259 by the brackets 262. The valves 103, 143, 195, 246, 247, and 263 are mounted on one side of the manifold, while the valve 178 is located in a forward part of the chamber 259, and the valve is supported on a block 260 that is located juxtaposed to the manifold 261. The valves 59, 103, 143, 159, 178, and 246 are of the piston type well known in the art, while the valves 247 and 263 are resistance valves for resisting the flow of fluid until it reaches a predetermined pressure.

The manifold 261 is provided with a plurality of passageways to which chambers of valve members are connected. The manifold 261 is also provided with passageways that interconnect the valves in order to cause coaction of two or more valves in order to cause the machine to produce certain functions.

The connections between the cylinders and the valves, and the valves and the source of supply and the reservoir are hereinafter referred to as passageways, and the flow of the fluid therethrough is controlled by changing location of the movable members of the valves. In the diagram shown in Fig. 25, the said passageways are indicated conventionally.

The solenoids of the valves are controlled by switches that are actuated in a general sequential relation, the first by the insertion of the article in position, and others by sequential operation of the cylinders or parts connected thereto to produce successive movements of the cylinders in the operation of the machine. The source of supply of electric current, indicated by the lines 266, is connected electrically to the system of the machine by means of the switches 267.

In the operation of the machine, the pump 29 is driven by the motor 33, and the pumps 31 and 32 are driven by the motor 34. The pump 32 is a small pump and operates to cause the flow of fluid under pressure through passageways 268 formed by the parts of the manifold 261 and the pipes that connect the pump 32 with the valve 59. The valve 59 is controlled by a pair of solenoids 58 and 252 having cores connected to the movable valve member which is suitably spring pressed by the springs 71 to restore the valve to its normal position when drawn therefrom by either of the solenoids 58, or 252. The lever 47 which is depressed by the article when it is placed in position in the machine closes the switch 57 to establish an electric circuit to the solenoid 58. The switch 57 is connected through the knife switch 269 by the line 271 and through the line 272 to the switch 267. The switch 57 is connected by means of the line 273, through the switch 243, which, when closed, connects the line 273 through the line 274 with the solenoid 58, the return connection to the main lines being through the line 276. The solenoid 58 moves the valve member of the valve 59 to connect the pump 32 and the passageway 268 with the passageway 277 which is connected to the cylinder 37.

The cylinder 37 is operated and, upon its initial movement, closes the switches 68 and 251 by movement of the cam 66, which maintains the circuit of the solenoid 58 through the line 278 that is connected to a main line 266 through the switches 267 and 269. The switch 68 connects the line 271 by means of the line 278 to a switch 69 which is normally maintained closed and is not actuated until the cylinder 37 has substantially completed its movement. The circuit extends from the switch 69 through the line 279 to the line 273 which short-circuits the switch 57 that is released by the movement of the article from the lever 47 by the operation of the cylinder 37. When the cylinder 37 initiates its movement, the switches 68 and 251 are closed and when it completes its movement, the switch 69 is opened by the cam surface 67. When the switch 69 is opened, it breaks the by-pass through the lines 278 and 279, and the connection of the circuit to the solenoid 58 is broken, which causes the return of the movable valve member to its neutral position by one of the springs 71 and disconnects the pump 32 with the cylinder 37.

As the switch 69 opens, it closes the switch 116 to complete a circuit from the lines 266, 272, and 278 to the line 281, through the switch 243, to the line 282 and the solenoid 114. The return from the solenoid 114 is through the connection 276. The solenoid 114 operates the valve 103. The valve 103 is connected to the pump 29 by means of the passageway 283, with the passageway 284 and the passageway 286 that connects with the cylinder 102 which actuates the sliding plate 83 in order to position the article in a general location for accurate subsequent alignment of parts of its surface with the broaches. Upon the completion of the stroke of the piston 101 of the cylinder 102 the switch 146 is closed which closes a circuit from the main line 266 through the line 271 to the line 287 that is connected through the switch 243 to the line 288 which in turn is connected with the solenoid 144. The solenoid 144 is connected to the return line 276.

The solenoid 144 operates the valve 143 to connect the passageway 284 which, as described above, was connected with the pump 29 through the passageway 283 by the operation of the valve 103. The movable valve member of the valve 143 connects the passageway 284 with the circuit leading through the passageway 289, the resistance valve 247, and the passageway 291 to the cylinder 133 which operates to raise the cylindrical cam block 118 and clamp the article between the heads 128 and the aligning anvils 129. The cylinder 133 also operates to close the switch 162 which connects the line 271 from one of the lines 266 with the line 292 through the switch 243, and the line 293 to the solenoid 161 that operates the valve 159. The solenoid 161 is connected to the return line 276. The movable valve member of the valve 159 is actuated by the solenoid 161 which establishes a connection with the passageway 289 through the resistance valve 263 and the passageway 294. The resistance valve 263 is connected to the passageway 289, and the passageway 289 is connected by means of the valve 143 to the passageway 284 which is in turn connected to the passageway 283 that is connected with the pump 29 by means of the valve 103. The resistance valve 263 is adjusted to produce a greater resistance to the flow of fluid therethrough than the resistance valve 247, and consequently the flow of the fluid through the passageway 289 through the resistance valve 263 will not occur until the piston in the cylinder 133 has completed its stroke, whereupon the pressure in the passageway will rise. Consequently, the fluid will flow from the pump 29 through the passageway 283, valve 103, passageway 284, valve 143, passageway 289, the resistance valve 263, the passageway 294, and the valve 159, to the passageway 296 which is connected to the cylinder 157 that releases the work-engaging pins 149 and locates them in position to engage and prevent the movement of the article with the broach during the broach cutting operation.

Upon the completion of the movement of the piston 156, the switch 176 is closed which connects one of the main lines 266 through the line 272, the switch 193, the line 297, the line 298 to the relay switch 238 that is normally maintained closed, the line 299 to the solenoid 179 which operates the valve 178. The circuit is completed from the solenoid 179 through the line 276. The valve 178 operates to connect the pump 31 through the passageway 301 with the passageways 302 to the cylinders 189. The cylinders 189 actuate the broaches, and, upon their operation, broach-cut the article. Upon the initial movement of the cylinders 189, the switches 234 and 249 are closed by the movement of the cam 237 and upon the completion of the stroke of the cylinders, the switch 236 is closed by the cam 237. This completes the circuit from a main line 266 through the line 271, the switch 234, the line 303, the switch 236, the line 304, the solenoid 241 of the relay switch 238 to the return line 276 and also through the solenoid 242 and to the return line 276. The solenoids 241 and 242 are connected in parallel and controlled by the switches 234 and 236. The solenoid 241 opens the relay switch 238 which opens the valve 178 and consequently movement of the cylinders 189 and the broaches 211 ceases.

Energization of the solenoids 242 operates the switch 243 to open the circuit to the solenoids 58, 114, 144, and 161 that are connected to the switch 243 by the lines 274, 282, 288, and 293, respectively. The valves 59, 103, 143, and 159 are returned to their normal positions upon de-energization of the solenoids 58, 114, 144, and 161, respectively, by the operation of their respectively associated springs 71. The valves 59, 103, 143, and 159, when in their normal positions, connect with the reservoir 26 through the pipe 308.

The switch 243 also closes the circuit from the line 304 to the solenoid 244 through the line 306. The return of the solenoid 244 is through the line 276. The solenoid 244 operates the movable member of the valve 246 to establish connections with the cylinders 102 and 133.

When the valve 103 is returned to its normal position by the operation of the solenoid 114, it connects the passageway 284 with the return passageway 308 leading to the reservoir 26. It also connects the passageway 283 with the passageway 309. The passageway 283 is connected to the pump 29 which produces a flow through the passageway 309 to the other end of the cylinder 157 to cause the return of the piston 156 and withdrawal of the work engaging pins 149 from the engaging relation with the article and also opens the switch 176.

The movable member of the valve 103 also connects the passageway 283 with the passageway 311 to the valve 246. Also upon the operation of the switch 243, the movable valve member of the valve 246 connects the passageway 312 with the pump 29 through the passageways 283 and 311. The passageway 312 is connected to the cylinders 102 and 133 by the passageways 313 and 314 to cause the return of the pistons of the cylinders. The return flow of the fluid from the cylinder 133 is through the resistance valve 247 and consequently the return of the piston of the cylinder 133 does not occur until the pressure of the fluid in the passageway 291 overcomes the resistance valve 247 to produce the return movement of the piston 101 and opening of the switch 146 in advance of the return movement of the piston of the cylinder 133 until the pressure rises sufficiently, due to the engagement of the piston 101 with the head of the cylinder 102, to overcome the counter resistance of the resistance valve 247 which will then permit the piston of the cylinder 133 to return and open the switch 162 and close the switch 248. The rollers 92, the cam block 118, and the work engaging pins 149 are thus restored in advance of the return movement of the cylinders 189.

The switch 248 connects with one of the lines 266 through the line 271 with the line 316 which is in turn completed to the line 317 by the switch 249 to the solenoid 181. The solenoid 181 is connected to the return line 276. The solenoid 181 operates the movable valve member of the valve 178 to establish connection with the pump 31 through the passageway 301 and the passageways 318 to the cylinders 189 to cause the return movement of the cylinders 189 and the return movement of the broaches.

In advance of the completion of the return movement of the cylinder 189, the valve 59 is reversed which causes the return of the cylinder 37. One of the main lines 266 is connected to the line 271, switch 248, line 316, switch 249, lines 317 and 319, switch 251, line 321 to the solenoid 252. The return from the solenoid 252 is through the line 276. The solenoid 252 operates to reverse the valve 59 and connect the passageway 268 from the pump 32 to the passageway 322 which is connected to the cylinder 37 to cause a return movement of the cylinder 37 to locate it in position for engagement of a succeeding article to be broached and to engage the article that has been previously broached. The return movement of the cylinder 37 closes the circuit of the lines 278 and 279 and opens the circuit from the lines 278 and 281 by the switch 116. Upon the completion of the return movement of the cylinder 37, the cam 66 opens the switches 68 and 251 that open the connection with the line 271 and also open the connection with the lines 319 and 321 which de-energizes the solenoid 252 and by the operation of the spring 71 returns the movable member of the valve 59 to its normal position.

Thus, the cylinders have been restored to their normal or initial positions, and the parts of the machine are located in position for producing the machine operations in connection with the succeeding article to be broached. Thus articles may be broached in succession, the machine producing its operations in cyclic order.

If desired, means may be provided for connecting parts of the circuit to produce operations of desired parts of the machine.

Thus, the control switches 193, 267, and 263 may be mounted on a panel 326 for producing the complete cycle of operations of the machine or selected steps of the cycle. The switch 193 may be provided with a rotatable contact member which will establish a connection with the line 266 and with either the line 297, whereby the machine may be caused to automatically perform its complete cycle of operation, or the line 327 which by-passes the switch 176 and connects with the line 298 to operate the valve 178 by energization of the solenoid 179 and cause a single working stroke of the cylinders 189, or the movable switch member 193 may connect the line 328 with the line 272. The line 328 is connected through the line 317 with the solenoid 181 that operates the movable valve member of the valve 178 to cause the return movement of the cylinders 189 and the broaches.

I claim:

1. A machine for broach-cutting articles, an article supporting means, a broach, a broach supporting means, an actuating means for moving the article to the said article supporting means, an actuating means for locating the article in a predetermined position with respect to the article supporting means, an actuating means for moving the article and the article supporting means to locate the article in a broach-cutting position, an article engaging means, a support actuating means controlled by the article engaging means for moving one supporting means relative to the other supporting means and lengthwise the broach to produce progressive broach-cutting of the article, and means operated by the support actuating means for causing the return of the said actuating means upon completion of the broach-cutting of the article.

2. In a machine for broach-cutting articles, an article supporting means, a broach, a broach supporting means, hydraulic means for moving the article to a predetermined position with reference to the article supporting means, hydraulic means for moving the article and article supporting means to the broach-cutting position, hydraulic means for engaging the article to prevent movement of the article with the broach, means for moving one supporting means relative to the other and lengthwise the broach to produce progressive broach-cutting, a source of supply of fluid under pressure, a manifold having a plurality of connections communicating with the said hydraulic means and the source of supply of fluid, a plurality of valves supported on the manifold for connecting the said hydraulic means to the source of supply of fluid under pressure through the said communicating passageways, and means operated by the said hydraulic means for operating the valves sequentially to produce sequential movements of the hydraulic means.

3. In a machine for broach-cutting articles, a bed, a housing supported on the bed, the bed and housing forming a chamber extending lengthwise of the machine, an article supporting means for supporting the article on the bed, an article moving means for moving the article along the chamber to the supporting means, and means located at one end of the chamber and engaged by the article for causing the operation of the said moving means, a broach slidably supported on the housing, means for lifting the article supporting means and securing the article to the housing and in alignment with the broach, means controlled by the article moving means for operating the article lifting and securing means, a broach actuating means controlled by the article securing means for initiating the operation of the broach actuating means, and means connected to the broach actuating means for engaging a previously broached article and moving the previously broached article lengthwise the said chamber to the other end of the chamber.

4. A machine for broach-cutting articles, a bed, a housing supported on the bed, the bed and housing forming enclosing walls, rails extending along the bed for guiding the article with reference to the bed, a supporting means for supporting the article, means for moving the article to the supporting means, a plurality of broaches supported on the housing, means for raising the article supporting means and securing the article to the housing, and a broach actuating means supported on the housing for broach-cutting of the article.

5. In a broaching machine, a bed, a housing supported on the bed, a pair of cylinders slidably supported in the housing and having fixed pistons, a bracket interconnecting the said cylinders, broach holders slidably supported in the housing, broaches secured in the holders, an article supporting means located on the bed, means for securing the article to the housing in broach-cutting position, a source of supply of fluid under pressure, and means for connecting the said cylinders to the said source for operating the broaches.

6. In a machine for broach cutting articles, a broach, a supporting means for supporting the broach, an article supporting means, an article moving means for moving the article to the article supporting means, an article support moving means for moving the article in alignment with the broach and controlled by the article moving means, an engaging means, means for moving the engaging means into article engaging position and controlled by the support moving means on location of the article in alignment with the broach, and means for moving the broach in a direction lengthwise the broach to produce progressive broach cutting of the article.

7. In a machine for broach cutting articles, an article supporting means, a broach, a broach supporting means, means for moving the article and the article supporting means to locate the article in a predetermined position with reference to the broach; a locking means for engaging the article, and means controlled by the support moving means for moving the locking means into position of article engagement substantially upon completion of the movement of the article supporting means, and means controlled by the movement of the locking means to produce broach cutting substantially upon engagement of the article by the locking means.

8. In a machine for broach cutting an article, an article supporting means, a broach, a broach supporting means, means for moving the article and the article supporting means to locate the article in the predetermined position with reference to the broach, a locking means for engaging the article, and means controlled by the support moving means for moving the locking means into position of article engagement, means controlled by the movement of the locking means for moving the broach supporting means to produce progressive broach cutting, and means controlled by the movement of the broach supporting means for restoring each of the said means to their normal positions.

9. In a machine for broach-cutting articles, a broach, a bed, an article supporting means located on the bed, means for moving the article over the bed and to the article supporting means, an article shifting means controlled by the said article moving means for shifting the article relative to the article supporting means and relative to the broach, means for moving the article and the article supporting means to a position for broach-cutting the article and controlled by the article shifting means, and means for moving the broach relative to the article for broach-cutting the article.

10. In a machine for broach-cutting articles, a bed, an article supporting means, a broach, a broach-supporting means, an article moving means for moving the article over the bed to the article supporting means, a movable article positioning means controlled by the article moving means for moving the article to a predetermined position with respect to the broach-supporting means substantially upon completion of the movement of the article moving means, a support moving means for moving the article-supporting means to locate the article in broach-cutting position and controlled by the said article positioning means substantially upon the completion of the operation of the article positioning means, a movable article engaging means, article locking means controlled by the support moving means substantially upon completion of the movement of the support moving means for moving the article engaging means to engage and secure the article in broach-cutting position, and means controlled by the article locking means for moving the broach-supporting means to broach-cut the article substantially upon completion of the movement of the article locking means.

11. In a machine for broach-cutting articles, a broach, a bed, an article supporting means located on the bed, an article moving means for moving the article over the bed and to the article supporting means, means controlled by the said article moving means for shifting the article relative to the article supporting means and relative to the broach, means controlled by the article shifting means for moving the article-supporting means and the article to a position for broach-cutting the article, means for moving the broach relative to the article for broach-cutting the article, and means carried by the article moving means for engaging and delivering the broach-cut article from the article supporting means as the first-named article is moved on to the article supporting means.

12. In a machine for broach-cutting articles, a bed, an article supporting means, a broach, a broach-supporting means, an article moving means for moving the article over the bed to the article-supporting means and having means for delivering broach-cut articles from the article-supporting means, a movable article positioning means controlled by the article moving means for shifting the article relative to a predetermined position relative to the article supporting means and the broach-supporting means substantially upon completion of the movement of the article moving means, a support moving means for moving the article-supporting means to locate the article in broach-cutting position and controlled by the said article-positioning means substantially upon the completion of the operation of the article positioning means, a movable article engaging means, an article locking means controlled by the support moving means substantially upon completion of the movement of the support moving means for moving the article engaging means to secure the article in broach-cutting position, means controlled by the article locking means for moving the broach-supporting means to broach-cut the article substantially upon completion of the movement of the article-engaging means, and means located on the broach-supporting means for moving the broach-cut article over the bed from the supporting means.

13. In a machine for broach-cutting articles, an article supporting means, a broach, a broach supporting means, an article moving means for moving the article to the said article supporting means, movable means for moving the article to a predetermined position with respect to the broach supporting means and controlled by the article moving means substantially upon completion of the movement of the article moving means, means for moving the article supporting means to carry the article to a broach-cutting position and means for moving one supporting means relative to the other supporting means and lengthwise the broach to produce progressive broach-cutting of the article.

14. In a machine for broach-cutting articles, an article supporting means, a broach, a broach supporting means, a support moving means for moving the article supporting means to carry and locate the article in a broach-cutting position, an engaging means controlled by the support moving means substantially upon completion of the movement of the support moving means for engaging the article upon movement of the support to a broach-cutting position, and means for moving one supporting means relative to the other and lengthwise the broach to produce progressive broach-cutting of the article.

15. In a machine for broach-cutting articles, an article supporting means, a broach, a broach supporting means, an article engaging means for securing the article in broach-cutting position, and means controlled by the article engaging means substantially when located in article engaging relation for moving one supporting means relative to the other and lengthwise the broach to produce progressive broach-cutting of the article.

16. In a machine for broach-cutting articles, a broach, a supporting means for supporting the broach, an article supporting means, hydraulically operated means for moving the article to the article supporting means, means engaged by the article when located in one position on the machine for initiating the operation of the said hydraulic means, means controlled by the hydraulically operated means for locating the article in a substantially predetermined position with respect to the broach and means for moving one supporting means relative to the other and in a direction lengthwise the broach to produce progressive broach-cutting of the article.

FRANCIS J. LAPOINTE.